(12) United States Patent
Shibata et al.

(10) Patent No.: US 9,542,031 B2
(45) Date of Patent: Jan. 10, 2017

(54) INPUT DEVICE USING DETECTION OF BOTH CAPACITANCE AND PRESSURE, AND CAPACITANCE-SYSTEM HYBRID TOUCH PANEL EQUIPPED WITH PRESSURE-SENSITIVE FUNCTION

(75) Inventors: Junichi Shibata, Kyoto (JP); Ryomei Omote, Kyoto (JP); Yoshihiro Kai, Kyoto (JP); Yuko Endo, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 418 days.

(21) Appl. No.: 14/128,819

(22) PCT Filed: Jun. 19, 2012

(86) PCT No.: PCT/JP2012/065565
§ 371 (c)(1),
(2), (4) Date: Mar. 24, 2014

(87) PCT Pub. No.: WO2012/176748
PCT Pub. Date: Dec. 27, 2012

(65) Prior Publication Data
US 2014/0218334 A1    Aug. 7, 2014

(30) Foreign Application Priority Data

Jun. 24, 2011 (JP) ................. 2011-140931
Jun. 24, 2011 (JP) ................. 2011-140933

(51) Int. Cl.
*G09G 5/00* (2006.01)
*G06F 3/041* (2006.01)
(Continued)

(52) U.S. Cl.
CPC ............ *G06F 3/0416* (2013.01); *G06F 3/044* (2013.01); *G06F 3/045* (2013.01); *G06F 3/0414* (2013.01)

(58) Field of Classification Search
CPC ............... G06F 3/03547; G06F 3/0414; G06F 2203/04107; G06F 2203/04111; G06F 3/044; G06F 3/045
(Continued)

(56) References Cited

U.S. PATENT DOCUMENTS 8,094,134 B2    1/2012   Suzuki et al.
2008/0018611 A1*  1/2008   Serban ................. G06F 3/0416
                                                           345/173
(Continued)

FOREIGN PATENT DOCUMENTS

EP     2 026 179 A1 * 10/2007   ............. G06F 3/044
EP     2 026 179       2/2009
(Continued)

OTHER PUBLICATIONS

Japanese Office Action (JOA) issued Oct. 14, 2014 in Japanese Patent Application No. 2013-521578.
(Continued)

*Primary Examiner* — Jennifer Nguyen
(74) *Attorney, Agent, or Firm* — Wenderoth, Lind & Ponack, L.L.P.

(57) ABSTRACT

An input device of the present invention is configured in the following manner: an input part includes electrode parts, which are contactable arranged with facing each other and one of which is to be an operation object, and a pressure-sensitive layer disposed between the electrode parts facing each other; a charge/discharge waveform forming part includes a charge/discharge circuit having a constant current source, a switching element, a capacitor and a resistor, and forms a charge/discharge waveform with a capacitance detection part and a resistance detection part connected; a charge/discharge waveform calculating part detects the change of a capacitance and of a pressure in the input part (Continued)

based on the charge/discharge waveform formed by the charge/discharge waveform forming part, and calculates an operation state, an operation position and an operation pressure.

19 Claims, 8 Drawing Sheets

(51) Int. Cl.
*G06F 3/044* (2006.01)
*G06F 3/045* (2006.01)

(58) Field of Classification Search
USPC .............................. 345/173, 174; 178/18.06
See application file for complete search history.

(56) References Cited

U.S. PATENT DOCUMENTS

| | | | | |
|---|---|---|---|---|
| 2008/0142281 | A1* | 6/2008 | Geaghan | G06F 3/044 178/18.06 |
| 2009/0183931 | A1 | 7/2009 | Okano et al. | |
| 2009/0207154 | A1 | 8/2009 | Chino | |
| 2010/0245284 | A1 | 9/2010 | Ito | |
| 2010/0321331 | A1 | 12/2010 | Oda et al. | |
| 2010/0321332 | A1 | 12/2010 | Oda et al. | |
| 2010/0321333 | A1 | 12/2010 | Oda et al. | |
| 2010/0321334 | A1 | 12/2010 | Oda et al. | |
| 2011/0115738 | A1 | 5/2011 | Suzuki et al. | |
| 2012/0038583 | A1* | 2/2012 | Westhues | G06F 3/0412 345/174 |

FOREIGN PATENT DOCUMENTS

| | | | | |
|---|---|---|---|---|
| JP | 7-129308 | | 5/1995 | |
| JP | 2008-152468 | | 7/2008 | |
| JP | 2010-231565 | * | 3/2009 | ............ G06F 3/041 |
| JP | 2009-175784 | | 8/2009 | |
| JP | 2009-176245 | | 8/2009 | |
| JP | 2009-193484 | | 8/2009 | |
| JP | 2009-258903 | | 11/2009 | |
| JP | 2010-117842 | | 5/2010 | |
| JP | 2010-231565 | | 10/2010 | |
| JP | 2011-3036 | | 1/2011 | |
| JP | 2011-100186 | | 5/2011 | |
| WO | 2010/074116 | | 7/2010 | |

OTHER PUBLICATIONS

International Search Report (ISR) issued Sep. 18, 2012 in International (PCT) Application No. PCT/JP2012/065565.
English translation of International Preliminary Report on Patentability issued Mar. 6, 2014 in International (PCT) Application No. PCT/JP2012/065565.

* cited by examiner

INPUT DEVICE USING DETECTION OF BOTH CAPACITANCE AND PRESSURE, AND CAPACITANCE-SYSTEM HYBRID TOUCH PANEL EQUIPPED WITH PRESSURE-SENSITIVE FUNCTION

TECHNICAL FIELD

The present invention relates to an input device for operating a specific area displayed on a screen using input means such as a finger, and particularly relates to an input device which uses the detection of both a capacitance and a pressure and also a capacitance-system hybrid touch panel equipped with a pressure-sensitive function.

BACKGROUND ART

In recent years, a touch panel has been developed and been provided in the market, as an input device that inputs various kinds of information into electronic equipment by operating a specific area displayed on a screen using input means in which a conductor such as a finger and a nonconductor such as a stylus are operated. As an input system used in a touch panel, various systems such as a resistance film system and a capacitance system are used. The resistance film system detects a position operated by input means, by applying a voltage to one resistance film of resistance films (electrodes) facing each other and by detecting a voltage change in the other resistance film according to the position being operated (refer to Patent Literature 1, for example). The capacitance system detects a position operated by input means by detecting the change of a capacitance between the input means and a conductive film or the change of a capacitance between conductive films (electrodes), (refer to Patent Literature 2, for example). In the capacitance system, since position detection is possible even in a state just before the input means contacts the conductive film, there is also proposed a configuration in which the capacitance system is used as a proximity sensor in an input device of the resistance film system (refer to Patent Literature 3, for example).

CITATION LIST

Patent Literatures

Patent Literature 1: Unexamined Japanese Patent Publication No. 2008-152468;
Patent Literature 2: Unexamined Japanese Patent Publication No. 2009-175784; and
Patent Literature 3: Unexamined Japanese Patent Publication No. 2010-231565.

SUMMARY OF INVENTION

Technical Problem

In an input device in the electronic equipment of recent years, inputting more information accurately and quickly by a simple operation is becoming an important task, irrespective of what kind of input means is used, for example, whether a stylus or a finger is used as the input means, for a specific area displayed on a screen. As a measure for achieving this task, there has been an idea in which a pressure detecting element is used to detect a pressure force against a screen being input means and in which the detection result (pressure information) of the pressure detecting element is employed as one of information. However, in order to use such a pressure detecting element for an input device in electronic equipment, not only a special area for providing a pressure detecting element is needed, but also it is necessary to build a special circuit configuration.

An object of the present invention is to provide an input device that can input a variety of information including position information into electronic equipment by detecting a capacitance, a resistance and a pressure with a simple circuit configuration, and to realize a highly general-purpose input device that can input a variety of information accurately and quickly by operating simple input means.

Solution to Problem

An input device of a first aspect according to the present invention comprises:

an input part including electrode parts which are arranged with facing each other and with being electrically connectable and one of which has an electrode to be an operation object, and a pressure-sensitive layer which is disposed between the electrode parts facing each other and an electrical resistance of which changes according to a pressure against the electrode part being the operation object by input means of a conductor;

a charge/discharge waveform forming part which includes a charge/discharge circuit having at least a constant current source, a switching element, a capacitor and a resistor and which forms a charge/discharge waveform by being connected to the input part;

a charge/discharge waveform calculating part which calculates an operation state, an operation position and an operation pressure of the input means by detecting a change of a capacitance and of a pressure in the input part based on a charge/discharge waveform formed by the charge/discharge waveform forming part; and an output part which outputs a signal showing the operation state, the operation position and the operation pressure of the input means calculated in the charge/discharge waveform calculating part. The input device of the first aspect of the present invention configured in this way can input the information of an operation state, an operation position and an operation pressure into electronic device by detecting the change of a capacitance and a pressure with a simple circuit configuration.

In an input device of a second aspect according to the present invention, the input part of the first aspect mentioned above is configured to output a capacitance detection signal, which shows a capacitance between the input means and the electrode being the operation object, and a resistance detection signal, which shows a resistance value between the electrode parts electrically connected via the pressure-sensitive layer, to the charge/discharge waveform forming part. The input device of the second aspect of the present invention configured in this way is configured such that the charge/discharge waveform is formed by a capacitance detection signal and a resistance detection signal, both of which are detected signals, and such that the change of a capacitance and a pressure appears in the charge/discharge waveform.

In an input device of a third aspect according to the present invention, the charge/discharge waveform forming part of the second aspect mentioned above is configured to be connected to the input part at least at time of discharge of the charge/discharge circuit, and to form the charge/discharge waveform according to the capacitance detection signal and the resistance detection signal. The input device of the third aspect of the present invention in this way is configured such that the change of a capacitance and a pressure appears in a waveform at the time of discharge in a charge/discharge waveform, enabling the detection of an operation state, an operation position and an operation pressure.

In an input device of a fourth aspect according to the present invention, the charge/discharge waveform calculating part of the third aspect mentioned above is configured to calculate discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The input device of the fourth aspect of the present invention configured in this way can accurately detect an operation state, an operation position and an operation pressure, by detecting the change of a capacitance and a pressure, based on a waveform at the time of discharge in a charge/discharge waveform.

In an input device of a fifth aspect according to the present invention, the charge/discharge waveform forming part of the second aspect mentioned above is configured to be connected to the input part at least at time of charge of the charge/discharge circuit, and to form the charge/discharge waveform according to the capacitance detection signal and the resistance detection signal. The input device of the fifth aspect of the present invention configured in this way is configured such that the change of a capacitance and a pressure appears in a waveform at the time of charge in a charge/discharge waveform, enabling the detection of an operation state, an operation position and an operation pressure.

In an input device of a sixth aspect according to the present invention, the charge/discharge waveform calculating part of the fifth aspect mentioned above is configured to calculate charge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The input device of the sixth aspect of the present invention configured in this way can accurately detect an operation state, an operation position and an operation pressure, by detecting the change of a capacitance and a pressure, based on a waveform at the time of charge in a charge/discharge waveform.

In an input device of a seventh aspect according to the present invention, the charge/discharge waveform forming part of the second aspect mentioned above is configured to be connected to the input part at time of charge and discharge of the charge/discharge circuit, and to form the charge/discharge waveform according to the capacitance detection signal and the resistance detection signal. The input device of the seventh aspect of the present invention configured in this way is configured such that the change of a capacitance and a pressure appears in a waveform at the time of charge and discharge in a charge/discharge waveform, enabling the detection of an operation state, an operation position and an operation pressure.

In an input device of an eighth aspect according to the present invention, the charge/discharge waveform calculating part of the seventh aspect mentioned above is configured to calculate charge time and discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The input device of the eighth aspect of the present invention configured in this way can accurately detect an operation state, an operation position and an operation pressure, by detecting the change of a capacitance and a pressure, based on a waveform at the time of charge and discharge in a charge/discharge waveform.

In an input device of a ninth aspect according to the present invention, the electrode part and the pressure-sensitive layer of the first aspect to the eighth aspect mentioned above are formed of an optically transparent material and are configured such that operation can be performed through the electrode part and the pressure-sensitive layer while visually observing a screen of a display device on which the input device is provided. The input device of the ninth aspect of the present invention configured in this way can build a device that has an excellent operability for the display device.

A hybrid touch panel as an input device of a tenth aspect according to the present invention is a capacitance-system hybrid touch panel equipped with a pressure-sensitive function and comprises:

an input part which includes;
a first electrode part which has a plurality of first electrode lines in parallel with each other and which is to be an operation object by input means of a conductor;
a second electrode part opposing the first electrode part and having a plurality of second electrode lines which are orthogonal to the plurality of first electrode lines and which are contactable and separable arranged in a matrix shape with respect to the plurality of first electrode lines;
a pressure-sensitive layer which is disposed between the first electrode part and the second electrode part as in the opposing manner and which is sandwiched and fixed between the first electrode part and the second electrode part by a pressure force of the input means against the first electrode part, and an electrical resistance value of which changes according to a pressure of the sandwiching and the fixing,
a detection circuit which is configured such that the input part is connected and such that a capacitance detection signal showing a capacitance between the input means and the first electrode part and a capacitance between the first electrode part and the second electrode part and a resistance detection signal showing an electrical resistance value between the first electrode part and the second electrode part which are electrically connected via the pressure-sensitive layer are inputted from the input part and such that an operation state, an operation position and an operation pressure of the input means are detected;
a first drive part having a plurality of switching elements which perform contact and separation between each of the plurality of first electrode lines and the detection circuit;
a second drive part having a plurality of switching elements which perform contact and separation between each of the plurality of second electrode lines and the detection circuit; and
a control part performing drive control of the first drive control part and the second drive control part. The hybrid touch panel of the tenth aspect according to the present invention configured in this way can detect the change of a capacitance and a pressure (resistance) with a simple circuit configuration, and can accurately detect an operation state, an operation position and an operation pressure, with a capacitance detection signal and a resistance detection signal inputted from an input part into a detection circuit.

In a hybrid touch panel as an input device of an eleventh aspect according to the present invention, the control part of the tenth aspect mentioned above is configured such that each predetermined number of neighboring electrode lines among the plurality of first electrode lines put together are defined as a first electrode line group and a plurality of first electrode line groups is defined as a first detection electrode and such that on-off control is performed for the switching element corresponding to the first detection electrode in the first drive part and such that drive control of the plurality of first electrode line groups is performed and also drive control of the plurality of second electrode lines defined as a second detection electrode is performed. The hybrid touch panel of the eleventh aspect according to the present invention configured in this way can accurately detect the change of a capacitance and a pressure (resistance) and can output the information of an operation state, an operation position and an operation pressure.

In a hybrid touch panel as an input device of a twelfth aspect according to the present invention, the control part of the eleventh aspect mentioned above is configured such that a plurality of selected second electrode lines obtained by thinning the plurality of second electrode lines is defined as the second detection electrode and such that on-off control is performed for the switching element corresponding to the second detection electrode in the second drive part and such that drive control of the selected second electrode lines is performed. The hybrid touch panel of the twelfth aspect according to the present invention configured in this way can accurately detect a capacitance with a simple circuit configuration.

In a hybrid touch panel as an input device of a thirteenth aspect according to the present invention, the control part of the eleventh aspect mentioned above is configured such that each predetermined number of neighboring electrode lines among the plurality of second electrode lines put together are defined as a second electrode line group and a plurality of second electrode line groups are defined as the second detection electrode and such that on-off control is performed for the switching element corresponding to the second detection electrode in the second drive part and drive control of the plurality of second electrode line groups is performed. The hybrid touch panel of the thirteenth aspect according to the present invention configured in this way can accurately detect a capacitance with a simple circuit configuration.

In a hybrid touch panel as an input device of a fourteenth aspect according to the present invention, the detection circuit of the tenth aspect to the thirteenth aspect mentioned above includes:

a charge/discharge waveform forming part which includes a charge/discharge circuit having at least a constant current source, a switching element, a capacitor and a resistor and which forms a charge/discharge waveform with the capacitance detection signal and the resistance detection signal inputted; and a charge/discharge waveform calculating part which detects a change of the capacitance and of the pressure in the capacitance detection signal and the resistance detection signal based on the charge/discharge waveform formed by the charge/discharge waveform forming part and which calculates the operation state, the operation position and the operation pressure of the input means. The hybrid touch panel of the fourteenth aspect according to the present invention configured in this way can accurately detect an operation state, an operation position and an operation pressure, by forming a charge/discharge waveform based on the capacitance detection signal and the resistance detection signal from the input part and by detecting the change of a capacitance and a pressure.

In a hybrid touch panel as an input device of a fifteenth aspect according to the present invention, the charge/discharge waveform forming part of the fourteenth aspect mentioned above is configured to be connected to the input part at least at time of discharge of the charge/discharge circuit, and to form the charge/discharge waveform according to the capacitance detection signal and the resistance detection signal. The hybrid touch panel of the fifteenth aspect according to the present invention configured in this way is configured such that the change of a capacitance and a pressure appears in a waveform at the time of discharge in a charge/discharge waveform, enabling the detection of an operation state, an operation position and an operation pressure.

In a hybrid touch panel as an input device of a sixteenth aspect according to the present invention, the charge/discharge waveform calculating part of the fifteenth aspect mentioned above is configured to calculate discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The hybrid touch panel of the sixteenth aspect according to the present invention configured in this way can accurately detect an operation state, an operation position and an operation pressure, by detecting the change of a capacitance and a pressure, based on a waveform at the time of discharge in a charge/discharge waveform.

In a hybrid touch panel as an input device of a seventeenth aspect according to the present invention, the charge/discharge waveform forming part of the fourteenth aspect mentioned above is configured to be connected to the input part at least at time of charge of the charge/discharge circuit, and to form the charge/discharge waveform according to the capacitance detection signal and the resistance detection signal. The hybrid touch panel of the seventeenth aspect according to the present invention configured in this way is configured such that the change of a capacitance and a pressure appears in a waveform at the time of charge in a charge/discharge waveform, enabling the detection of an operation state, an operation position and an operation pressure.

In a hybrid touch panel as an input device of an eighteenth aspect according to the present invention, the charge/discharge waveform calculating part of the seventeenth aspect mentioned above is configured to calculate the charge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The hybrid touch panel of the eighteenth aspect according to the present invention configured in this way can accurately detect an operation state, an operation position and an operation pressure, by detecting the change of a capacitance and a pressure, based on a waveform at the time of charge in a charge/discharge waveform.

In a hybrid touch panel as an input device of a nineteenth aspect according to the present invention, the charge/discharge waveform forming part of the fourteenth aspect mentioned above is configured to be connected to the input part at time of charge and discharge of the charge/discharge circuit, and to form the charge/discharge waveform according to the capacitance detection signal and the resistance detection signal. The hybrid touch panel of the nineteenth aspect according to the present invention configured in this way is configured such that the change of a capacitance and a pressure appears in a waveform at the time of charge and discharge in a charge/discharge waveform, enabling the detection of an operation state, an operation position and an operation pressure.

In a hybrid touch panel as an input device of a twentieth aspect according to the present invention, the charge/discharge waveform calculating part of the nineteenth aspect mentioned above is configured to calculate charge and discharge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object. The hybrid touch panel of the twentieth aspect according to the present invention configured in this way can accurately detect an operation state, an operation position and an operation pressure, by detecting the change of a capacitance and a pressure, based on a waveform at the time of charge and discharge in a charge/discharge waveform.

In a hybrid touch panel as an input device of a twenty-first aspect according to the present invention, the electrode part and the pressure-sensitive layer of the tenth aspect to twentieth aspect mentioned above are formed of an optically transparent material and are configured such that an operation can be performed through the electrode part and the pressure-sensitive layer while visually observing a screen of a display device on which the hybrid touch panel is provided. The hybrid touch panel of the twenty-first aspect according to the present invention configured in this way can build a device that has an excellent operability for a display device.

In a hybrid touch panel as an input device of a twenty-second aspect according to the present invention, the input part of the tenth aspect to twentieth aspect mentioned above is formed on a film-like display device and is configured such that an operation is performed through the display device. The hybrid touch panel of the twenty-second aspect according to the present invention configured in this way can accurately detect an operation state, an operation position and an operation pressure as a film-like display device, for example, an organic EL (OLED) input device.

Advantageous Effects of Invention

According to the present invention, it is possible to realize a highly general-purpose input device that can input a variety of information accurately and quickly by operating simple input means; it is possible to stably detect a capacitance, a resistance and a pressure with a simple circuit configuration, and it is also possible to input a lot of information into electronic equipment based on each detected result.

DESCRIPTION OF EMBODIMENTS

Embodiments according to the input device of the present invention will be specifically described below with reference to the accompanying drawings. The present invention is not limited to specific configurations described in the embodiments below, but includes a scope constructed based on technologies similar to technological ideas described in the embodiments and common general technical knowledge in this technical field.

First Embodiment

Figure 1:
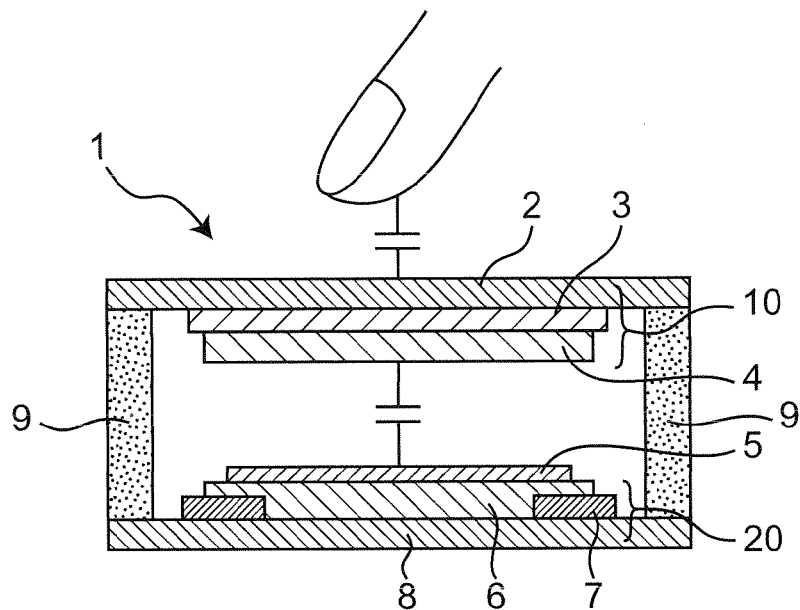
FIG. 1 is a schematic view illustrating a cross sectional configuration of an input part in an input device of a first embodiment according to the present invention.

FIG. 1 is a schematic view illustrating a cross sectional configuration of an input part in an input device of a first embodiment according to the present invention. The input device of the first embodiment is a touch panel provided on a portable electronic device, and is formed on a liquid crystal screen of a display device. Description will be made using an example in which this input device is formed of optically transparent materials on the whole. Accordingly, the input device of the first embodiment is configured such that the input device can be operated for a specific area displayed on the liquid crystal screen while visually observing, irrespective of what kind of input means is used, for example, whether a stylus or a finger is used as the input means. In the first embodiment, although a portable electronic device is described as an example, the present invention is not limited to a portable electronic device, but is applicable to a variety of electronic equipment having an input device for use in integration with a display device.

In FIG. 1, an input part 1 in the input device of the first embodiment includes: an upper electrode part 10 and a lower electrode part 20 which are a pair of electrode parts arranged with facing each other; a pressure-sensitive layer 5 provided between the upper electrode part 10 and the lower electrode part 20; and an adhesion part 9 that fixes the upper electrode part 10 to the lower electrode part 20 so that the upper electrode part 10 can come in contacted with or separate from the lower electrode part 20. Accordingly, when the upper electrode part 10 is not pressurized (pressed downward from above in FIG. 1), i.e. in a non-operation state, the upper electrode part 10 is arranged so as to face the lower electrode part 20, having a prescribed distance (gap) relative to the lower electrode part 20. On the other hand, when the upper electrode part 10 is pressurized, i.e. in a depression load state, the upper electrode 10 is electrically connected to the lower electrode 20 via the pressure-sensitive layer 5. Accordingly, it is configured such that the upper electrode part 10 is flexible enough to be contactable and separable relative to the lower electrode part 20.

The upper electrode part 10, which is one electrode part, is configured to have an upper film 2, which is an operation object face operated by input means, such as a finger, an upper wiring pattern 3 and an upper detection electrode 4. The lower electrode part 20, which is the other electrode part, is configured to have a lower detection electrode 6, a lower wiring pattern 7 and a lower film 8 fixed to the substrate (not shown) of the display device. In the first embodiment, although the description is made using an example in which the pressure-sensitive layer 5 is formed on a face the upper detection electrode 4 in the lower detection electrode 6, on the contrary, the pressure-sensitive layer 5 may be formed on a face opposing the lower detection electrode 6 in the upper detection electrode 4, with the same effect obtained irrespective of a face on which the pressure-sensitive layer 5 is formed.

In the input part 1 in the input device of the first embodiment as configured above, by bringing a finger close to the upper film 2, i.e. the operation object face, a change in a capacitance arises in a capacitive coupling formed between the finger and the upper electrode part 10. At this time, there is also a capacitive coupling between the electrodes, with a capacitance existing between the electrodes. By further bringing the finger close to the upper film 2 and by pressing the operation object face of the upper film 2, the upper detection electrode 4 and the lower detection electrode 6 are electrically connected via the pressure-sensitive layer 5. At this time, the resistance value of the pressure-sensitive layer 5 changes according to a pressure force.

A composition composing the pressure-sensitive layer 5 is made up of a conductive material, of which the electrical properties, such as an electrical resistance value, change according to an external force. With respect to the composition of the pressure-sensitive layer 5, as the upper electrode part 10 and the lower electrode part 20 contact with each other and are pressurized, there flows a tunneling current between conductive pressure-sensitive particles existing in the inner part of the composition of the pressure-sensitive layer 5, regardless of the presence of a direct contact, which changes a state from an insulation state to an energized state. That is, the pressure-sensitive layer 5 changes its electrical resistance value according to a pressure force, and have a characteristic that the electrical resistance value becomes small as the pressure force becomes large. With respect to the composition composing a pressure-sensitive layer having a characteristic like this, said composition as a usable one includes, for example, QTC inks, which are quantum tunneling composites available with a brand name "QTC" and "QTC Clear" from Peratech LTD. of Darlington in Britain, etc.

The pressure-sensitive layer 5 of the input part 1 in the first embodiment is formed through coating on a face opposing the upper detection electrode 4 on the lower detection electrode 6. The pressure-sensitive layer 5 can be formed using a printing method, such as screen printing, offset printing, gravure printing or flexographic printing.

Figure 2:
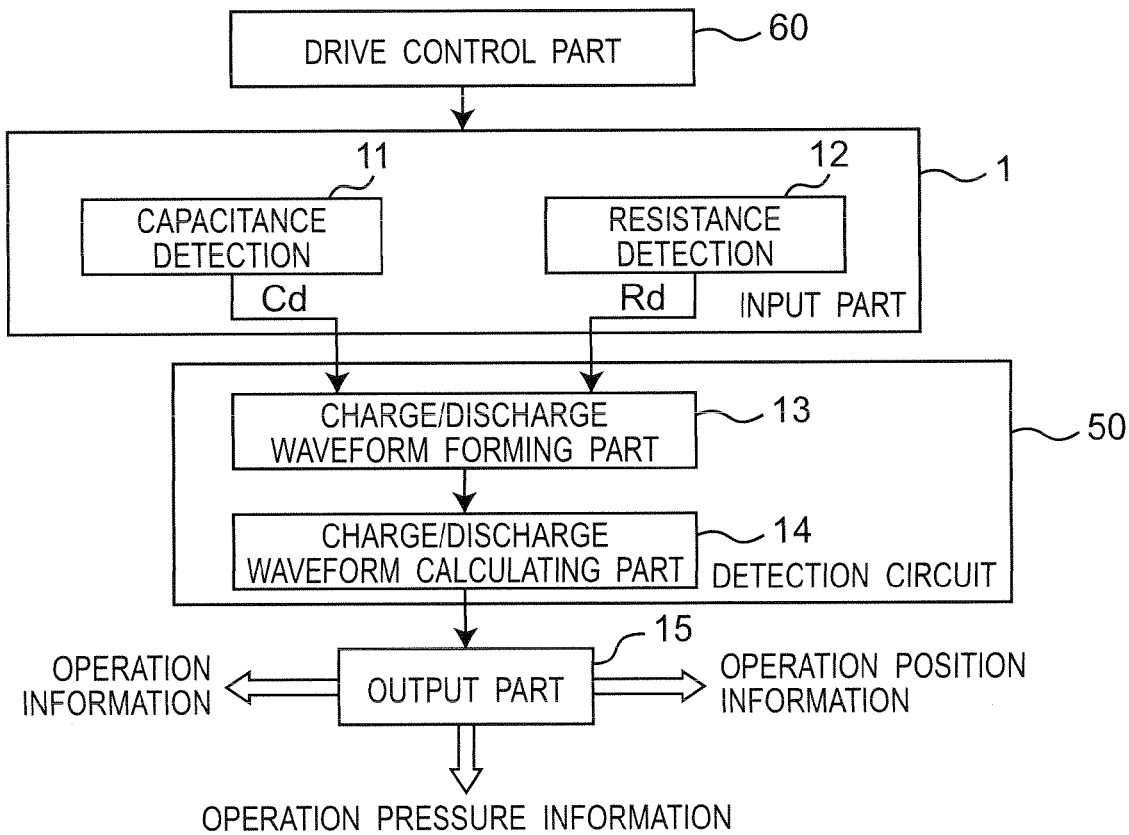
FIG. 2 is a block diagram illustrating a configuration of the input device of the first embodiment according to the present invention.

FIG. 2 is a block diagram illustrating the configuration of the input device of the first embodiment. As mentioned above, the input part 1 shown in FIG. 1 is configured to combine capacitance detection 11 for detecting the change of a capacitance in the input part 1 and resistance detection 12 for detecting the change of an electrical resistance value in the input part 1. The input device of the first embodiment includes: a charge/discharge waveform forming part 13 which forms a charge/discharge waveform (Va) using a capacitance detection signal (Cd) by the capacitance detection 11 and a resistance detection signal (Rd) by the resistance detection 12; a charge/discharge waveform calculating part 14 which detects the change of a capacitance and the change of a resistance value (pressure change) in the input part 1 based on the charge/discharge waveform formed in the charge/discharge waveform forming part 13 and which calculates a finger motion (operation state), a finger position (operation position) and a finger pressure force (operation pressure) in an operation object face; an output part 15 which outputs a signal showing the operation state, the operation position and the operation pressure based on a signal from the charge/discharge waveform calculating part 14 (see FIG. 2).

Figure 3:
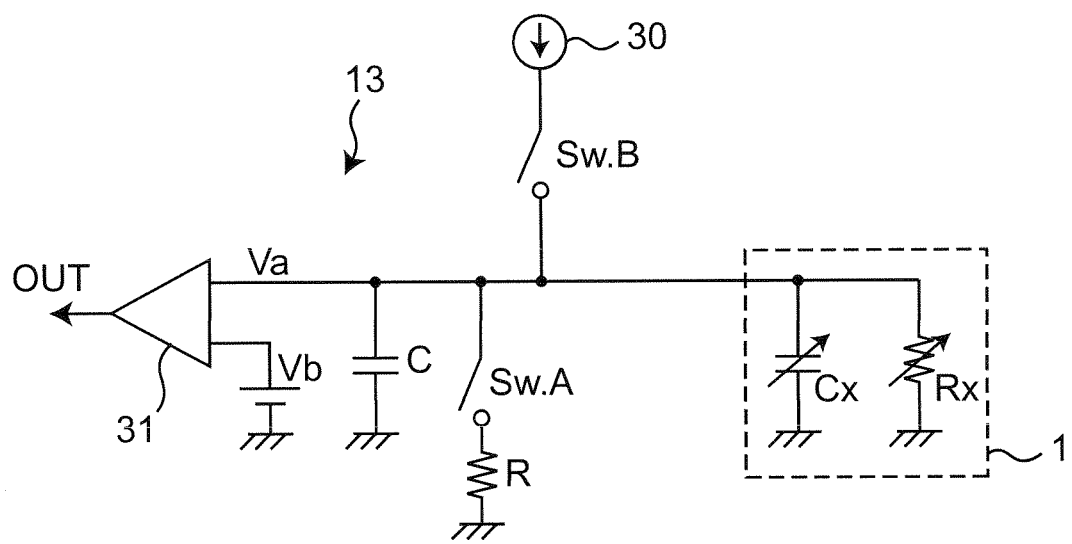
FIG. 3 is a diagram illustrating a circuit configuration of a charge/discharge waveform forming part in the input device of the first embodiment according to the present invention.

The charge/discharge waveform forming part 13 in the input device of the first embodiment will be described below. FIG. 3 is a diagram illustrating the circuit configuration of the charge/discharge waveform forming part 13.

In FIG. 3, circuit elements which a variable capacitance (Cx) and a variable resistance (Rx) show correspond to a capacitance and a resistance detected in the capacitance detection 11 and the resistance detection 12 of the input part 1 in the input device. Accordingly, the variable capacitance (Cx) includes a capacitance between input means, e.g., a finger and the upper electrode part 10, a capacitance between the upper electrode part 10 and the lower electrode part 20 and a capacitance which a circuit in the input part 1 has, etc. The variable resistance (Rx) includes an electrical resistance between the upper electrode part 10 and the lower electrode part 20 via the pressure-sensitive layer 5, and an electrical resistance that the circuit in the input part 1 has, etc.

As shown in FIG. 3, the charge/discharge waveform forming part 13 is configured such that a capacitor C and the input part 1 are charged with a current from a constant current source 30 and discharge is performed in a resistor R and the input part 1 by the switching action of switching elements (SwA, SwB). The constant current source 30 is connected to the capacitor C via a second switch B, and a first switch A is provided between the capacitor C and the resistor R. The capacitor C is connected to one input terminal of a comparator 31. A reference voltage (Vb) is inputted into the other input terminal of the comparator 31. The comparator 31 is configured to output a discharge end detection signal when the discharge voltage of the capacitor C reaches the reference voltage (Vb).

The charge/discharge waveform forming part 13 in the input device of the first embodiment has a charge/discharge circuit composed of the constant current source 30, the capacitor C, the resistor R and the two switching elements (SwA, SwB). This charge/discharge circuit is configured such that the input part 1 is connected to the charge/discharge circuit into which the capacitance detection signal (Cd) formed by the variable capacitance (Cx) and the resistance detection signal (Rd) formed by the variable resistance (Rx) are inputted.

In the circuit of the charge/discharge waveform forming part 13 shown in FIG. 3, when the first switch A is in an off-state and the second switch B is in an on-state, a current from the constant current source 30 flows into the capacitor C and the input part 1, and so electric charge corresponding to a prescribed capacitance is charged in the capacitor C and the input part 1 (charging action). In the first embodiment, a control method is used where a charging action is ended by judging that a prescribed amount of electric charge is charged in the capacitor C and the input part 1 when charge time reaches a definite period of time; but a circuit configuration and a control method may be used where a charging action is ended and a discharging action is started when it is detected that the charge voltage (Va) of the capacitor C and the input part 1 has reached a prescribed voltage (Vp).

When electric charge corresponding to the prescribed capacitance is charged in the capacitor C and the input part 1, a charging action is ended and a discharging action is started. With respect to the discharging action, when the first switch A is in an on-state and the second switch B is in an off-state, the electric charge which has been charged in the capacitor C and the input part 1 flows into the resistor R, and so discharge is performed. At this time, since the circuit of the charge/discharge waveform forming part 13 is connected to the input part 1, a discharge state is to be affected by the variable capacitance (Cx) and the variable resistance (Rx) in the input part 1. When the prescribed voltage (reference voltage: Vb) is reached with the prescribed electric charge of the capacitor C and the input part 1 discharged, the discharging action is stopped and a charging action is started by an output signal (discharge end detection signal) from the comparator 31.

Figure 4:
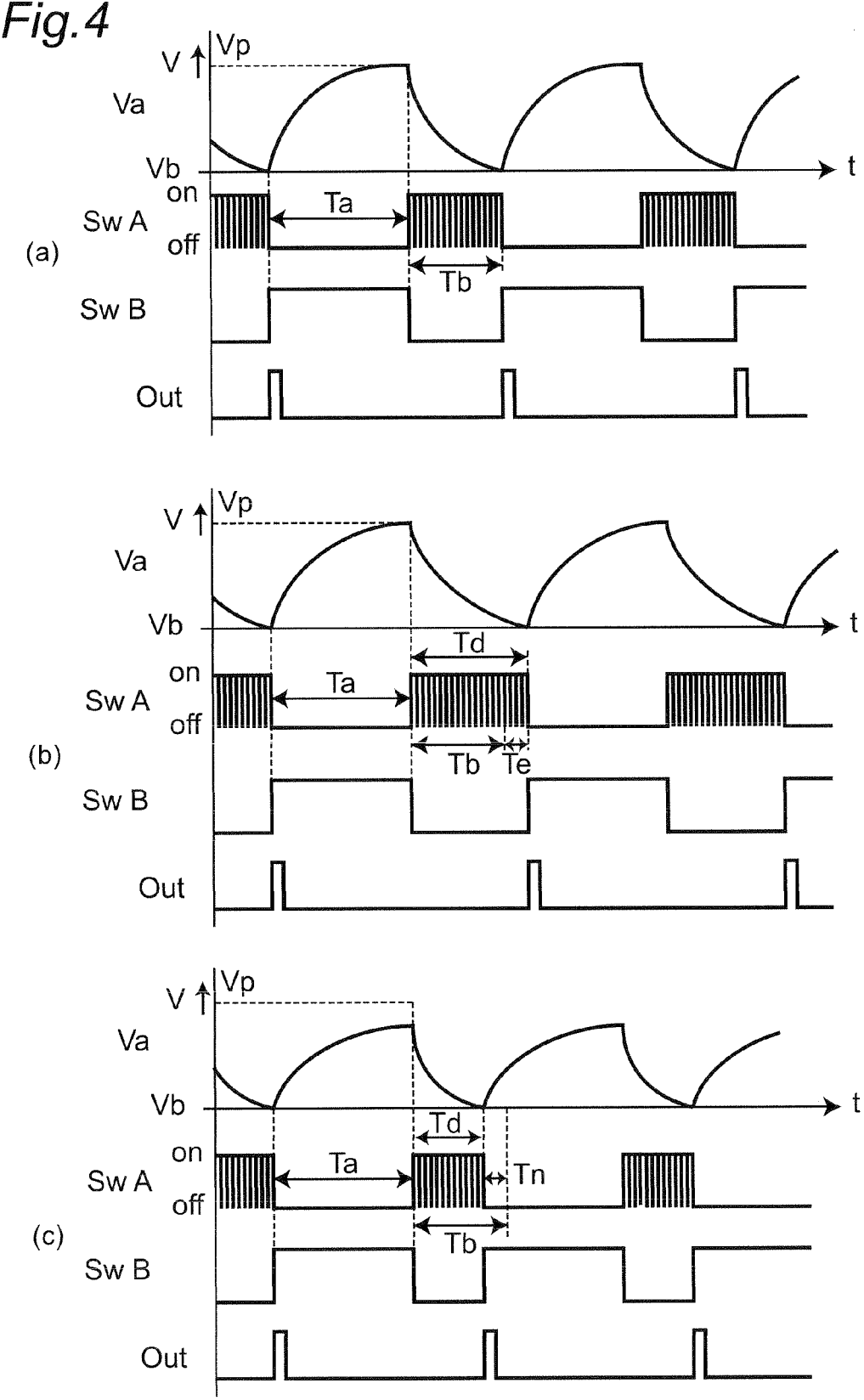
FIG. 4 is waveform diagrams in each element of the charge/discharge waveform forming part in the input device of the first embodiment according to the present invention.

FIG. 4 is waveform diagrams in each element in the charge/discharge waveform forming part 13. In FIG. 4, the charge/discharge waveform Va shows a voltage waveform inputted into the comparator 31 from the capacitor C and the input part 1, and SwA and SwB show the on-off state of the first switch A and the second switch B, respectively. The sign "Out" in FIG. 4 shows the output signal (discharge end detection signal) from the comparator 31.

In FIG. 4, (a) is a waveform diagram in a state (non-operation state) where the input device is not operated, (b) is a waveform diagram in a state (proximity state) where a finger, i.e. input means, is close to or in contact with the operation object face of the input device, and (c) is a waveform diagram in a state (depression load state) where the operation object face of the input device is depressed by the finger and the upper detection electrode 4 and the lower detection electrode 6 are electrically connected via the pressure-sensitive layer 5.

As shown in (a) of FIG. 4, the capacitor C and the input part 1 repeat a charging action and a discharging action intermittently by turning on and off the first switch A and the second switch B. Accordingly, the off-period (Ta) of the first switch A is a predetermined period, and the on-period Tb of the first switch A is almost the same period when a capacitance change by the capacitance detection 11 of the input part is minute, and so turning on and off is repeated at almost the same interval in this period (Ta, Tb) in a non-operation state. The first switch A performs a discharging action in which on-off action is repeated intermittently in minute time in the on-period (Tb) of the first switch A (a discharging action period). Accordingly, the discharge waveform of discharge occurring in the resistor R via the first switch A is a step-wise waveform microscopically. With the on-off action in the minute time in this first switch A counted, the detection of discharge time is performed. The count of the on-off action of this first switch A is detected in the charge/discharge waveform calculating part 14 (see FIG. 2), and so it is possible to form operation state information, operation position information and operation pressure information by using the change of a count number.

The waveform diagram shown in (b) of FIG. 4 represents a state where a finger, i.e. input means, is close to or in contact with the operation object face of the input device and where the upper detection electrode 4 and the lower detection electrode 6 are not in contact with each other. That is, this represents a state where the finger is close to the operation object face and where the finger and the upper electrode part 10 are capacitively coupled. At this time, there also exists a capacitive coupling state between the upper electrode part 10 and the lower electrode part 20. As a result, in a state where the finger is close to or in contact with the operation object face, the variable capacitance (Cx) in the input part 1 (see FIG. 3) has changed, compared with the non-operation state shown in (a) of FIG. 4. Since the magnitude of a capacitance is inversely proportional to a distance between the finger and the upper electrode part 10 located on the operation object face, the capacitance between the finger and the upper electrode part 10 becomes large as the finger approaches the operation object face. As a result, detection discharge time Td in the charge/discharge waveform (Va) becomes longer by time (Te), compared with a non-operation state shown in (a) of FIG. 4. This detection discharge time (Td) is detected by the count number of the on-off action of the minute time of the first switch A. In this way, the operation state information and the operation position information of the finger on the operation object face can be determined by the change of the detection discharge time (Td) based on the change of a capacitance. In a proximity state shown in (b) of FIG. 4, the variable resistance (Rx) shown in FIG. 3 is infinite, indicating that a shut-off state is formed.

The waveform diagram shown in (c) of FIG. 4 represents a depression load state where the operation object face of the input device is depressed by the finger and where the upper detection electrode 4 and the lower detection electrode 6 are electrically connected via the pressure-sensitive layer 5. As mentioned above, the pressure-sensitive layer 5 has a characteristic that its electrical resistance value becomes small according to the magnitude of a pressure when it is pressurized. In the depression load state shown in (c) of FIG. 4, there is no capacitive coupling state as seen in the case of the proximity state shown in FIG. 4(b), and there is a stable connected state between the finger, i.e. input means, and the upper electrode part 10 of the operation object face, and between the upper electrode part 10 and the lower electrode part 20. Accordingly, in the depression load state shown in (c) of FIG. 4, the variable capacitance (Cx) shown in FIG. 3 substantially becomes zero, and there appears a state where a current flows into the variable resistance Rx. However, since a stray capacitance and the like exist in the circuit, the variable capacitance Cx cannot be zero. As a result, charging may not be performed up to the prescribed voltage (Vp) due to an insufficient charging period in the period of charge time (Ta) of the charge/discharge waveform (Va). With the influence above and the influence of the increase of a discharge current, the detection discharge time (Td) in the charge/discharge waveform (Va) becomes shorter by time (Tn), compared with the non-operation state shown in (a) of FIG. 4. In this way, the operation state information of the finger on the operation object face, the operation position information of the finger on the operation object face and the operation pressure information of the finger against the operation object face can be determined by detecting the detection discharge time (Td) from the change of an electrical resistance in the input part 1. The depression load state includes a state where the upper electrode part 10 and the lower electrode part 20 are merely electrically in contact with each other.

Figure 5:
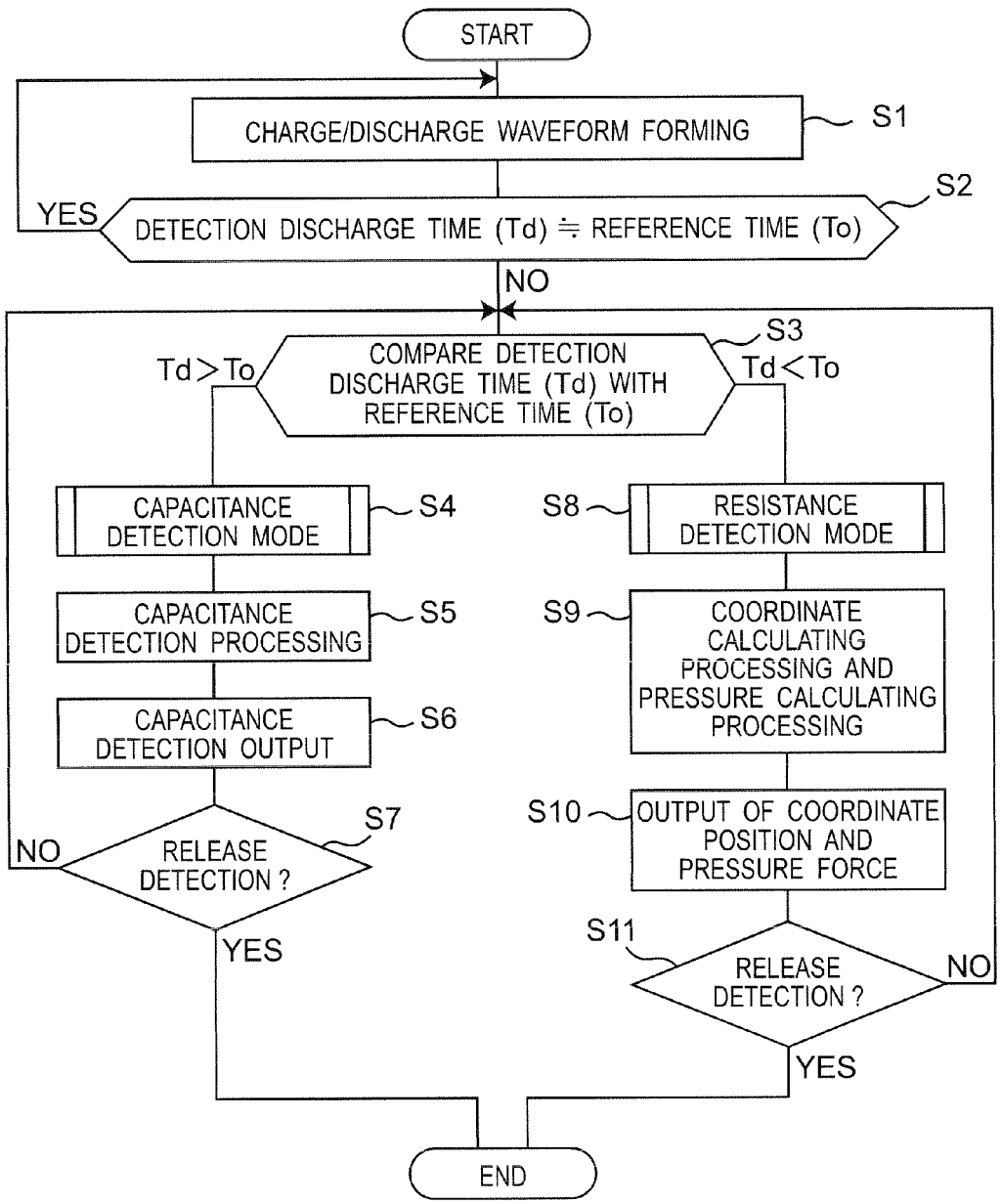
FIG. 5 is a flow chart illustrating a detection sequence for detecting a capacitance and a pressure in the input device of the first embodiment according to the present invention.

FIG. 5 is a flow chart illustrating a detection sequence for detecting a capacitance and a pressure in the input device of the first embodiment.

First, with electric power supplied to the input device, the detection sequence starts in the input device. In step 1 (S1) in the detection sequence, a charge/discharge waveform Va is formed in the charge/discharge waveform forming part 13, as mentioned above. The detection discharge time Td in the formed charge/discharge waveform is compared with a reference time (To). Here, the reference time (To) is the discharge time Tb in a non-operation state (see (a) of FIG. 4) in the input device, and is set using time measured at the time of the non-operation state. In step 2 (S2), when the detection discharge time (Td) is almost the same as the reference time (To), the present state is regarded as a non-operation state and a return to step 1 (S1) is made.

In step 3 (S3), when the detection discharge time (Td) is longer than the reference time (To) by a certain period or more, the present state is regarded as a proximity state, and a shift to a capacitance detection mode (S4) is made. On the other hand, when the detection discharge time Td is shorter than the reference time To by a certain period or more, the present state is regarded as a depression load state, and a shift to a resistance detection mode (S8) is made.

In the capacitance detection mode (S4), capacitance detection processing (S5) that detects the change of a capacitance (C+Cx: see FIG. 3) is performed based on the detection discharge time Td, and capacitance detection output (S6) is performed based on the detected change of a capacitance. That is, an operation state indicating whether or not the input device has been operated is detected. After the capacitance detection output (S6) is performed, whether or not the finger, i.e. input means, is separated from the input device is detected (release detection) in step 7 (S7). This release detection (S7) is performed in step 2 (S2), by comparing the detection discharge time (Td) and the reference time (To). When the detection discharge time (Td) is almost the same as the reference time To, the release detection is performed, and the detection sequence is completed. On the contrary, when the detection discharge time (Td) differs from the reference period (To), a return to step 3 (S3) is made, and a shift to the capacitance detection mode (S4) or the resistance detection mode (S8) is made.

In the resistance detection mode (S8), the change of a resistance value (R*Rx/(R+Rx): see FIG. 3) is detected based on the detection discharge time Td, and coordinate calculating processing and pressure calculating processing (S9) are performed. As an example of this coordinate calculating processing, with one end of one of opposing electrodes connected to the input terminal of a detection circuit 50 configured by the charge/discharge waveform forming part 13 and the charge/discharge waveform calculating part 14, and with one end of the other electrode grounded, the resistance value including the change of the pressure-sensitive layer 5 can be measured. In this resistance value measurement, by modifying the combination of a connection state how one end of an electrode connected to the detection circuit 50 and one end of the other electrode grounded are connected, it is possible to detect a coordinate position (operation position) operated by the finger, i.e. input means, in the electrode. Such switching control is performed in a drive control part 60 (see FIG. 2). The drive control part 60 is configured by a plurality of switching elements, and performs the switching control of each electrode in coordinate calculating processing and pressure calculating processing. In the pressure calculating processing, since the resistance value of the pressure-sensitive layer 5 changes according to an extent to which the pressure-sensitive layer 5 is pressurized, a pressure force (operation pressure) is detected by detecting the change of a resistance value in a specified coordinate position.

In step 10 (S10), a signal showing the detected coordinate position (operation position) and the detected pressure force (operation pressure) is outputted to the control part (not shown) of a portable electronic device on which the input device is provided, and a shift to the release detection is made.

In the release detection in step 11 (S11), and in manner similar to the manner in the release detection (S7) in the capacitance detection mode mentioned above, the detection discharge time (Td) and the reference time (Vo) are compared, and when the detection discharge time (Td) is equal to the reference time (Vo), the release detection is performed, and so the detection sequence is completed. On the contrary, when the detection discharge time (Td) differs from the reference time (Vo), a return to step 3 (S3) is made, and a shift to the capacitance detection mode (S4) or the resistance detection mode (S8) is made.

As mentioned above, the detection sequence in the input device of the first embodiment is performed; each of a capacitance (operation state), a coordinate position (operation position) and a pressure force (operation pressure) is detected; a signal showing each of the above is outputted to the control part (not shown) of the portable electronic device on which the input device is provided; thus, the portable electronic device is controlled.

In the input device of the first embodiment, although description was made using an example in which a finger is used as input means, the input means in the present invention is not limited to a finger, but anything can be used when it is a conductor.

In the input device of the first embodiment, although description was made using an example in which the capacitance detection signal (Cd) detected by the capacitance detection 11 and a resistance detection signal (Rd) detected by the resistance detection 12 in the input part 1 are used as a discharge waveform at the time of discharge in the charge/discharge waveform (Va), the present invention is not limited to this configuration, but the capacitance detection signal (Cd) and the resistance detection signal (Rd) which are detected by the capacitance detection 11 and the resistance detection 12, respectively, can also be used as a charge waveform at the time of charge. By using the capacitance detection signal (Cd) and the resistance detection signal (Rd) outputted from the input part 1 at the time of charge, it is possible to detect that the behavior of a charge waveform changes according to a capacitance and a resistance value, and it is also possible to detect each of a capacitance (operation state), a coordinate position (operation position) and a pressure force (operation pressure).

Furthermore, in the present invention, by using both of a charge waveform at the time of charge and a discharge waveform at the time of discharge in the charge/discharge waveform (Va), it is also possible to detect each of a capacitance (operation state), a coordinate position (operation position) and a pressure force (operation pressure) with higher accuracy. Also in this case, by using the capacitance detection signal (Cd) detected by the capacitance detection 11 and the resistance detection signal (Rd) detected by the resistance detection 12 in the input part (1) described in the first embodiment, a change appears in a charge waveform at the time of charge and in a discharge waveform at the time of discharge according to each of a capacitance (operation state), a coordinate position (operation position) and a pressure force (operation pressure), and this phenomenon can be used, enabling highly accurate detection.

Since the input part 1 in the input device of the first embodiment is provided on the liquid crystal screen of the display device and is formed of optically transparent materials on the whole, the input part is configured such that input is performed by operating the operation object face of the input part 1 by a finger, i.e. input means, while visually observing. Accordingly, the upper film 2, the upper wiring pattern 3, the upper detection electrode 4, the pressure-sensitive layer 5, the lower detection electrode 6, the lower wiring pattern 7 and the lower film 8 in the input part 1 are formed of optically transparent materials. With respect to the configuration of the first embodiment, although description was made on a configuration where there exists air (index of refraction:1) in an internal space (opposing area) of the input part 1 in which the upper electrode part 10 and the lower electrode part 20 are arranged with facing each other, a configuration including a solution layer may be used in consideration of optical properties of the upper electrode part 10 and the lower electrode part 20, etc. As a solution layer, it is preferable to use a substance which has an index of refraction close to that of each material in the structure of the upper electrode part 10 and the lower electrode part 20, that is, a substance which has an index of refraction same as that of air or larger and which has fluidity, optical transparency, electrical insulation and heat resistance.

As a material of the upper film 2 and the lower film 8, a material usable for a flexible substrate can be used, which includes general-purpose resin such as, for example, polyethylene terephthalate, polystyrene-based resin, polyolefin-based resin, ABS resin, AS resin, acrylic resin or AN resin. The thicknesses of the upper detection electrode 4 and the lower detection electrode 6 are set at, for example, 5 μm to 25 μm. As a material of the upper detection electrode 4 and the lower detection electrode 6, it is preferable to use a transparent electrically conducting material such as an ITO, a CNT and an Ag wire ink. However, it is also possible to form the upper detection electrode 4 and the lower detection electrode 6 using a paste with electrical conductivity, which includes metal such as gold, silver, copper or nickel, or carbon. A method for forming these includes a printing method such as screen printing, offset printing, gravure printing, or flexographic printing, or a photoresist method, etc. The upper detection electrode 4 and the lower detection electrode 6 can also be formed by pasting a metal foil such as a copper foil or a gold foil. Furthermore, the upper detection electrode 4 and the lower detection electrode 6 can also be formed in a way described as follows: an electrode pattern is formed with a resist on an FPC (flexible circuit board) which is plated with metal such as copper, and then a metal foil portion which is not protected by the resist is processed by etching.

In order to secure the opposing area of the upper electrode part 10 and the lower electrode part 20, an adhesive agent 9 as a gap holding member is provided. The adhesive agent 9 has adhesiveness that glues the upper film 2 and the lower film 8 together and also serves as an insulating member for holding a gap between the opposing faces of the upper detection electrode 4 and the pressure-sensitive layer 5. As an adhesive agent 9, a two-sided adhesive tape is included, for example, in which an adhesive agent such as an acrylic bonding paste is formed on both sides of a core material such as a polyethylene terephthalate film. The thickness of the adhesive agent 9 is set at, for example, 5 μm to 20 μm. The adhesive agent 9 may include various adhesive agents such as a UV curing resin and a heat curing resin, with a thickness set at 5 μm to 20 μm.

As mentioned above, the input device of the first embodiment according to the present invention can input operation state information, operation position information and operation pressure information into electronic equipment, by detecting a capacitance, a resistance and a pressure with a simple circuit configuration, irrespective of what kind of input means is used, for example, whether the input means is a finger or a stylus; the input device is a highly general-purpose input device that can input a variety of information accurately and quickly by operating simple input means.

Second Embodiment

Embodiments according to a hybrid touch panel as an input device according to the present invention will be specifically described below with reference to the accompanying drawings. The present invention is not limited to the specific configuration of a hybrid touch panel described in a second embodiment below, but includes a scope constructed based on technologies similar to technological ideas described in the second embodiment and common general technical knowledge in this technical field. The hybrid touch panel in the present invention refers to one configured in the following manner: by operating input means, for example, by operating a finger or a stylus (including non-contact, contact and pressing action), the hybrid touch panel can detect an operation state, an operation position and an operation pressure and can output the variety of information being detected.

The hybrid touch panel as an input device according to the present invention combines the configuration of a resistance-film-system digital-type (multi-type) touch panel and the configuration of capacitance-system self-type touch panel; the capacitance-system hybrid touch panel equipped with a pressure-sensitive function which has a configuration capable of performing the pressure detection of a pressure force of input means (finger) will be described as the second embodiment below.

The configuration of the capacitance-system hybrid touch panel equipped with a pressure-sensitive function described in the second embodiment is an example as an input device, and other configurations are included in the present invention. As a capacitance-system touch panel, there is a mutual-type touch panel in which a plurality of electrode lines of a transmitting side and a plurality of electrode lines of a receiving side are arranged in a matrix shape (mesh), and a capacitance between each of the transmitting-side electrode lines and each of the receiving-side electrode lines is detected, and then, based on the detected results, the operation state (action state) and the operation position (coordinate position) of the input means are detected. In the present invention, it is also possible to build a capacitance-system touch panel equipped with a pressure-sensitive function, by replacing a detection method in the mutual-type touch panel with a detection method in the self-type touch panel described in the second embodiment. That is, by using a fact that a capacitance changes according to the operation state (action state) and the operation position (coordinate position) of the input means and that, as a consequence, the behavior of a charge/discharge waveform changes as mentioned below, it is possible to detect the operation state (action state) and the operation position (coordinate position).

In the general configuration of a resistance-film-system digital-type touch panel, X-axis electrode lines for detecting the position of an X-direction and Y-axis electrode lines for detecting the position of a Y-direction are arranged in a matrix shape (mesh). On the other hand, a general capacitance-system self-type touch panel has X-axis electrode lines for detecting the position of the X-direction and Y-axis electrode lines for detecting the position of the Y-direction in a manner similar to the manner in the configuration of the digital-type touch panel, but each electrode line is configured to have a certain width in order to improve detection sensitivity for a capacitance. Accordingly, when the configuration of the X-axis electrodes and the Y-axis electrodes in the resistance-film-system digital-type touch panel is used for an capacitance-system self-type touch panel without any modification, there arises a problem that the detection sensitivity deteriorates, due to the narrow width of the electrode lines. Since detection objects (a resistance and a capacitance) detected by the X-axis electrodes and the Y-axis electrodes are completely different from each other in the two configurations, the circuit configurations of a detection circuit and a control circuit, etc. are greatly different from each other, and so a touch panel could not be constructed even when these are combined.

In the capacitance-system mutual-type touch panel, in order to prevent deteriorated sensitivity due to mutual interference and also to improve detection sensitivity, the width of the receiving-side electrode lines is widen and the width of the transmitting-side electrode lines is narrowed. In the configuration of the resistance-film-system digital-type touch panel, the width of the X-axis electrode lines and the width of the Y-axis electrode lines are narrow and are equal to each other, being a different configuration from that of the mutual-type touch panel. Accordingly, when the configuration of the capacitance-system mutual-type touch panel is used for the resistance-film-system digital-type touch panel, with deteriorated resolution and deteriorated accuracy in detected coordinates accuracy anticipated, the two configurations cannot be easily combined.

The present invention provides a configuration that combines the configuration of the resistance-film-system digital-type (multi-type) touch panel and the configuration of the capacitance-system self-type touch panel, or provides a configuration that combines the configuration of the resistance-film-system digital-type (multi-type) touch panel and the configuration of the capacitance-system mutual-type touch panel; in order to achieve the combined configuration, the touch panel of interest includes an upper electrode part 10 (a first electrode part) having a plurality of first electrode lines (Y-axis electrode lines, receiving-side electrode lines) and a lower electrode part 20 (a second electrode part) having a plurality of second electrode lines (X-axis electrode lines, transmitting-side electrode lines) with the Y-axis electrode lines and the X-axis electrode lines arranged in a matrix shape (mesh); the touch panel is configured to perform a switching operation which puts a plurality of electrode lines together and/or a switching operation which thins a plurality of electrode lines according to a situation for each of the electrode lines of the upper electrode part 10 and the lower electrode part 20.

In the description of the second embodiment, a specific configuration and action relating to a capacitance-system hybrid touch panel equipped with a pressure-sensitive function as an input device according to the present invention will be described below.

The capacitance-system hybrid touch panel equipped with the pressure-sensitive function of the second embodiment according to the present invention will be described below with reference to the accompanying drawings.

Figure 6:
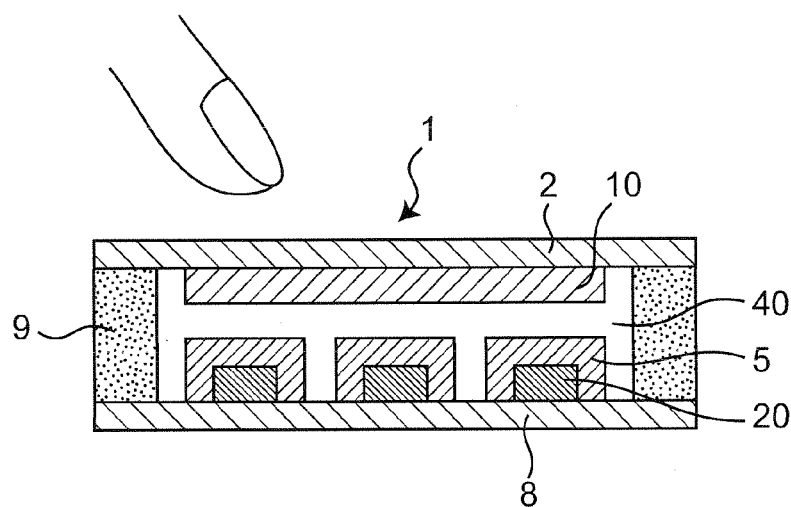
FIG. 6 is a schematic view of a cross sectional configuration of an input part in a hybrid touch panel of a second embodiment according to the present invention.

FIG. 6 is a schematic view illustrating the cross sectional configuration of an input part in the capacitance-system hybrid touch panel with the pressure-sensitive function of the second embodiment according to the present invention. The hybrid touch panel of the second embodiment is a touch panel provided on a portable electronic device, and is provided on the liquid crystal screen of a display device. This hybrid touch panel will be described using an example in which this is formed of optically transparent materials on the whole. Accordingly, the hybrid touch panel of the second embodiment is configured to be operated by a finger for a specific area displayed on the liquid crystal screen while visually observing. Although a portable electronic device is described as an example in the second embodiment, the present invention is not limited to a portable electronic device, but is applicable to a variety of electronic equipment having a touch panel for use in integration with a display device. In addition, the hybrid touch panel of the present invention can be configured with being arranged on a reverse face in a film-like display device (organic EL (OLED)) etc.

In FIG. 6, an input part 1 in the hybrid touch panel of the second embodiment includes: an upper electrode part 10 and a lower electrode part 20 which are a plurality of opposing electrode lines arranged on the matrix of the X-axis and Y-axis (arranged in a matrix shape (mesh)); a pressure-sensitive layer 5 provided between the upper electrode part 10 and the lower electrode part 20; and an adhesion part 9 that contactable and separable holds (fixes) the upper electrode part 10 and the lower electrode part 20. Accordingly, when the upper electrode part 10, which is an operation object area (operation object face), is not pressurized (pressed downward from above in FIG. 6), i.e. in a non-operation state, the upper electrode part 10 is arranged so as to face the lower electrode part 20, having a prescribed distance (gap: opposing area 40) relative to the lower electrode part 20. On the other hand, when the upper electrode part 10 is pressurized, i.e. in a depression load state, the upper electrode 10 is electrically connected to the lower electrode 20 via the pressure-sensitive layer 5. Accordingly, it is configured such that the upper electrode part 10 is flexible enough to be contactable and separable relative to the lower electrode part 20. An electrode line in the upper electrode part 10 and the lower electrode part 20 is not limited to one having a linear shape, but one having a wave-like shape or one the width of which varies in the middle, etc. may be used.

The upper electrode part 10, which is one electrode part, is provided on the reverse face of an upper film 2, which is an operation object face operated by a finger as input means. The lower electrode part 20, which is the other electrode part, is provided on a lower film 8 fixed to the substrate (not shown) of the display device. In the second embodiment, although description is made using an example in which the pressure-sensitive layer 5 is formed on the lower electrode part 20, on the contrary, the pressure-sensitive layer 5 may be formed on the upper electrode part 10, with a similar effect obtained irrespective of a face on which the pressure-sensitive layer 5 is formed.

Figure 7:
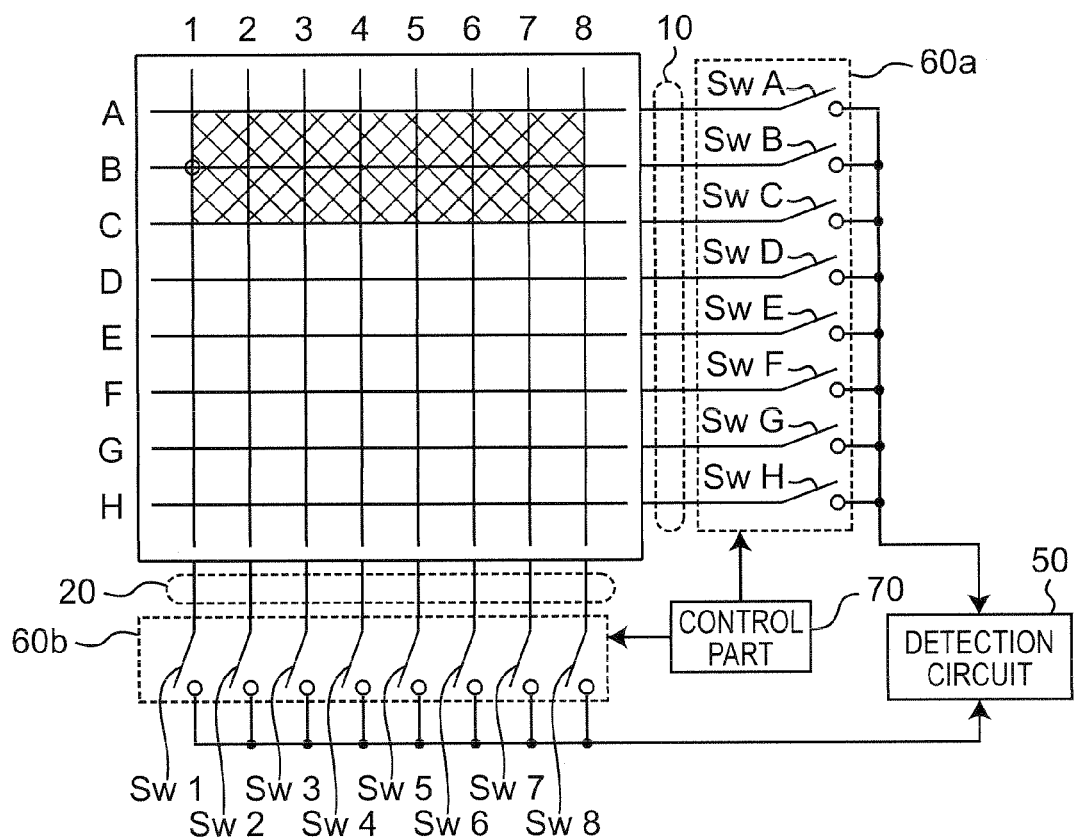
FIG. 7 is an explanatory drawing illustrating a matrix configuration of the input part 1 and a configuration of a switching element in the hybrid touch panel of the second embodiment according to the present invention.

FIG. 7 is an explanatory drawing illustrating the matrix configuration and the configuration of a switching element of the input part 1 in the hybrid touch panel of the second embodiment of the present invention. In FIG. 7, the upper electrode part 10 and the lower electrode part 20 arranged in a matrix shape is described using an example in which each of the upper and lower electrode parts 10, 20 is composed of eight electrode lines (A to H, and 1 to 8), in order to make the description easy to understand.

As shown in FIG. 7, switching elements (SwA to SwH) are provided on each of the first electrode lines (A to H) of the upper electrode part 10, respectively, and each of the first electrode lines (A to H) is connected to a detection circuit 50 mentioned below via the switching elements (SwA to SwH), respectively. Switching elements (Sw1 to Sw8) are provided on each of the second electrode lines (1 to 8) of the lower electrode part 20, respectively, and each of the second electrode lines (1 to 8) is connected to the detection circuit 50 mentioned below via the switching elements (Sw1 to Sw8), respectively.

In the hybrid touch panel of the second embodiment, and in a state where a finger, i.e. input means, is close to or in contact with the operation object area of the hybrid touch panel, that is, in a state where the upper electrode part 10 and the lower electrode part 20 is not in contact with each other, the following switching control actions (capacitance detection processing) are performed.

In order to detect a capacitance in the electrode lines (the first electrode lines) of the upper electrode part 10 with high sensitivity, switching control for each of the switching elements (SwA to SwH) is performed such that a plurality of neighboring electrode lines in the first electrode lines (A to H), for example, neighboring three electrode lines are put together as one electrode line group. The switching control that puts the plurality of neighboring electrode lines together and make them act as one electrode group in this way is performed by transmitting a drive control signal from control part 70 to a first drive circuit 60a having the plurality of switching elements (SwA to SwH) which turns on and off (contact and separation) each of the first electrode lines (A to H), respectively.

As a specific example of switching control in which the control part 70 performs drive control, for example, three electrode lines (A, B, C) among the first electrode lines are put together as one electrode line group which is called a first electrode line group X, and corresponding three switching elements (SwA, SwB, SwC) are turned on, the first electrode line group X being connected to the detection circuit 50. With the first electrode line group X connected to the detection circuit 50 in this way, a capacitance in the first electrode line group X is detected. At this time, a voltage in the second electrode lines (1 to 8) is set at a stable voltage (for example, GND electrical potential) in order to reduce the influence of a capacitance on the first electrode line group x. As mentioned above, with a plurality of electrode lines among the first electrode lines put together in the upper electrode part 10, an upper electrode group X are composed, which substantially widens an electrode width and improves detection sensitivity. With similar actions performed, that is, with the second electrode lines connected to the detection circuit and with the voltage of the first electrode lines set at a stable voltage, the detection sensitivity of the lower electrode can be improved.

Since the hybrid touch panel of the second embodiment is configured to perform self-type capacitance detection, when the operation state of a finger, i.e. input means, is detected, detection sensitivity can be improved by optimizing the area of the upper electrode part 10 and the lower electrode part 20 through the switching control of the switching elements.

Also in the case of a hybrid touch panel that detects a capacitance in a mutual-type method, detection sensitivity can be improved by widening the receiving-electrode width of a receiving-side electrode part, i.e. the upper electrode part, and by narrowing the transmitting-electrode width of a transmitting-side electrode part, i.e. the lower electrode part.

Next, in the hybrid touch panel of the second embodiment, and in a depression load state where the operation object face of the hybrid touch panel is depressed by a finger and where a corresponding electrode line in the upper electrode part 10 is electrically connected to a corresponding electrode line in the lower electrode part 20 via the pressure-sensitive layer 5, the following switching control actions (coordinate calculating processing and pressure calculating processing) are performed.

When a depression load state is detected in the detection circuit 50 of the hybrid touch panel, on-off operations of the switching elements (SwA to SwH) connected to the first electrode lines (A to H) and on-off operations of the switching elements (Sw1 to Sw8) connected to the second electrode lines (1 to 8) are performed sequentially (resistance detection processing). Specifically, for example, in a state where one switching element (Sw1) for the lower electrode part 20 is turned on and the second electrode line (1) is connected to the detection circuit 50, switching control that turns the switching elements (SwA to SwH) for the upper electrode part 10 into an on-state once is performed sequentially, and the first electrode lines (A to H) in the upper electrode part 10 are sequentially connected to the detection circuit 50. In this way, by connecting each of the first electrode lines (A to H) to the detection circuit 50, resistance values in all the first electrode lines (A to H) for the second electrode line (1) are detected in the detection circuit 50.

As described above, when the switching control of all the switching elements (SwA to SwH) for the second electrode line (1) is completed, the switching control of the switching elements (SwA to SwH) for a next second electrode line (2) is sequentially performed in a similar manner. In this way, with the switching control of the switching elements (SwA to SwH) for all the second electrode lines (1 to 8) performed sequentially, resistance values in all the coordinate positions (detection points) in the operation object area are to be detected in the detection circuit 50.

In a manner similar to the manner in which switching control is performed in the capacitance detection processing mentioned above, a plurality of the first electrode lines are put together as one electrode line group, and resistance detection processing on each detection point may be performed while a thinning action is performed for the second electrode lines. With resistance detection processing performed in this way, faster detection speed can be achieved by reducing detection points.

In the hybrid touch panel of the second embodiment, each predetermined number of neighboring electrode lines among the plurality of second electrode lines (1 to 8) put together are defined as a second electrode line group, and a plurality of the second electrode line groups are defined as a second detection electrode; the control part 70 is configured to drive and control the plurality of the second electrode line group by performing on-off control for a switching element corresponding to the second detection electrode in a second drive part 60b. However, the present invention is not limited to a control method like this, and other control methods are also possible. For example, selected second electrode lines (1, 3, 5, 7) obtained by thinning the plurality of second electrode lines (1 to 8) is defined as a second detection electrode; the control part 70 is configured to drive and control the selected second electrode lines (1, 3, 5, 7), by performing on-off control for switching elements (Sw1, Sw3, Sw5, Sw7) corresponding to the second detection electrode in the second drive part 60b.

As another control method, in case that a plurality of electrode line (a first electrode line and/or a second electrode line) are put together and processed as one electrode line group, for example, a last detection electrode is first electrode lines (A, B), a next detection electrode is first electrode lines (B, C), and a still next detection electrode is first electrode lines (C, D); in this manner, a part of electrode lines may be configured to be overlapped. In this way, not only by putting a plurality of electrode lines together, but also by sequentially performing on-off control for an electrode line group a part of which is overlapped, deteriorated resolution can be prevented while sensitivity improved.

A detection method for detecting an operation state for the operation object face, an operation position in the operation object face and an operation pressure in the operation object face operated by a finger, i.e. input means, using a capacitance detection signal (Cd) and a resistance detection signal (Rd) outputted from the input part 1 in the hybrid touch panel of the second embodiment will be described in detail below.

In the input part 1 in the hybrid touch panel of the second embodiment as configured above, by bringing a finger close to the upper film 2, i.e. the operation object face, a change in a capacitance arises in a capacitive coupling formed between the finger and the upper electrode part 10. At this time, there is also a capacitive coupling between the electrodes, a capacitance existing between the electrodes. By further bringing the finger close to the upper film 2 and by pressing the operation object face of the upper film 2, the upper electrode part 10 and the lower electrode part 20 are electrically connected via the pressure-sensitive layer 5. At this time, the resistance value of the pressure-sensitive layer 5 changes according to a pressure force.

A composition composing the pressure-sensitive layer 5 is made up of a conductive material, the electrical properties, such as an electrical resistance, of which change according to an external force. With respect to the composition of the pressure-sensitive layer 5, as the upper electrode part 10 and the lower electrode part 20 contact with each other and are pressurized, there flows a tunneling current between conductive pressure-sensitive particles existing in the inner part of the composition of the pressure-sensitive layer 5, regardless of the presence of a direct contact, which changes a state from an insulation state to an energized state. That is, the pressure-sensitive layer 5 changes its electrical resistance value according to a pressure force, and have a characteristic that the electrical resistance value becomes small as the pressure force becomes large. With respect to a composition composing a pressure-sensitive layer having a characteristic like this, said composition as a usable one includes, for example, QTC inks, which are quantum tunneling composites available with a brand name "QTC" and "QTC Clear" from Peratech LTD. of Darlington in Britain, etc.

The pressure-sensitive layer 5 of the input part 1 in the second embodiment is formed through coating on a face opposing the upper electrode part 10 on the lower electrode part 20. The pressure-sensitive layer 5 can be formed using a printing method, such as screen printing, offset printing, gravure printing or flexographic printing.

Figure 8:
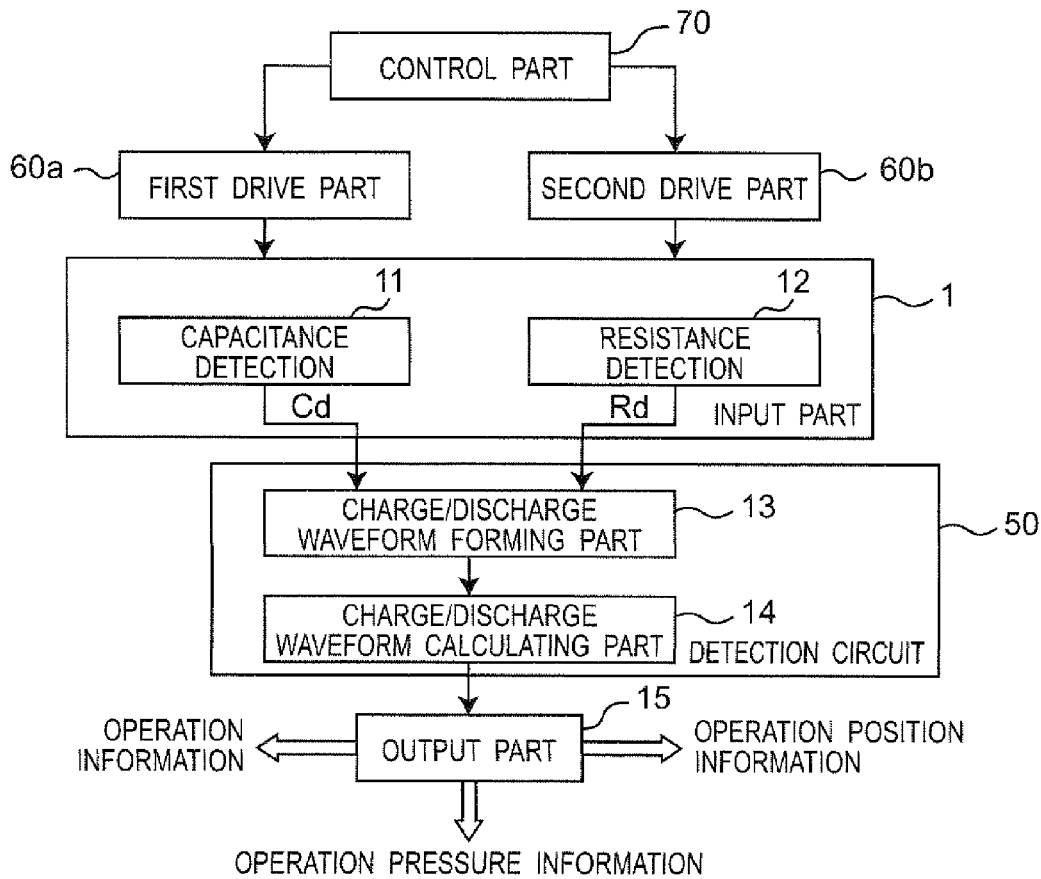
FIG. 8 is a block diagram illustrating a configuration of the hybrid touch panel of the second embodiment according to the present invention.

FIG. 8 is a block diagram illustrating the configuration of the hybrid touch panel of the second embodiment. As mentioned above, the input part shown in FIG. 6 is configured to combine capacitance detection 11 that detects the change of a capacitance in the input part 1 and resistance detection 12 that detects the change of an electrical resistance value in the input part 1. The hybrid touch panel of the second embodiment includes: a charge/discharge waveform forming part 13 which forms a charge/discharge waveform (Va) using a capacitance detection signal (Cd) by the capacitance detection 11 and a resistance detection signal (Rd) by the resistance detection 12; a charge/discharge waveform calculating part 14 which detects the change of a capacitance and the change of a resistance value (pressure change) in the input part 1 based on the charge/discharge waveform formed in the charge/discharge waveform forming part 13 and which calculates a finger motion (operation state), a finger position (operation position) and a finger pressure force (operation pressure) in an operation object face; an output part 15 which outputs a signal showing the operation state, the operation position and the operation pressure based on a signal from the charge/discharge waveform calculating part 14 (see FIG. 7). Here, the detection circuit 50 is configured by the charge/discharge waveform forming part 13 and the charge/discharge waveform calculating part 14.

Figure 9:
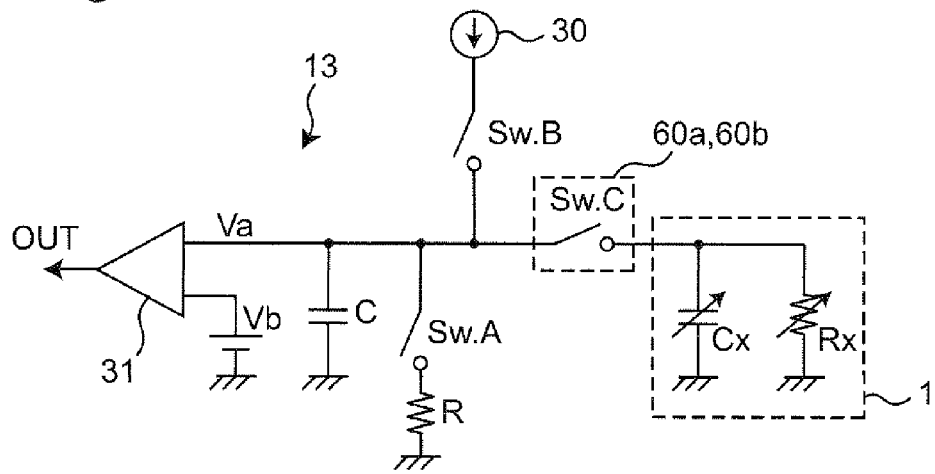
FIG. 9 is a diagram illustrating a circuit configuration of a charge/discharge waveform forming part in the hybrid touch panel of the second embodiment according to the present invention.

The charge/discharge waveform forming part 13 in the hybrid touch panel of the second embodiment will be described below. FIG. 9 is a diagram illustrating the circuit configuration of the charge/discharge waveform forming part 13.

In FIG. 9, circuit elements which a variable capacitance (Cx) and a variable resistance (Rx) represent are those which correspond to a capacitance and a resistance detected in the capacitance detection 11 and the resistance detection 12. Accordingly, the variable capacitance (Cx) includes a capacitance between a finger, i.e. input means, and the upper electrode part 10, a capacitance between the upper electrode part 10 and the lower electrode part 20 and a capacitance which a circuit in the input part 1 has, etc. The variable resistance (Rx) includes an electrical resistance via the pressure-sensitive layer 5 between the upper electrode part 10 and the lower electrode part 20 and an electrical resistance which the circuit in the input part 1 has, etc.

As shown in FIG. 9, the charge/discharge waveform forming part 13 is configured such that a capacitor C and the input part 1 are charged with a current from a constant current source 30 and discharge is performed in a resistor R and the input part 1 by the switching action of switching elements (SwA, SwB, SwC). The constant current source 30 is connected to the capacitor C via a second switch 13, and a first switch A is provided between the capacitor C and the resistor R. The capacitor C is connected to one input terminal of a comparator 31. A reference voltage (Vb) is inputted into the other input terminal of the comparator 31. The comparator 31 is configured to output a discharge end detection signal when the discharge voltage of the capacitor C reaches the reference voltage (Vb).

The charge/discharge waveform forming part 13 in the hybrid touch panel of the second embodiment has a charge/discharge circuit composed of the constant current source 30, the capacitor C, the resistor R and the two switching elements (SwA, SwB). The input part 1 is connected to this charge/discharge circuit via a first drive part 60a and a second drive part 60b, and is configured such that the capacitance detection signal (Cd) formed by the variable capacitance (Cx) and the resistance detection signal (Rd) formed by the variable resistance (Rx) are inputted.

In the circuit of the charge/discharge waveform forming part 13 shown in FIG. 9, when the first switch A is in an off-state and the second switch B is in an on-state, a current from the constant current source 30 flows into the capacitor C and the input part 1, and so electric charge corresponding to a prescribed capacitance is charged in the capacitor C and the input part 1 (charging action). In the second embodiment, a control method is used where a charging action is ended by judging that the prescribed amount of electric charge is charged in the capacitor C and the input part 1 when charge time reaches a definite period of time; but a circuit configuration and a control method may be used where a charging action is ended and a discharging action is started when it is detected that the charge voltage (Va) of the capacitor C and the input part 1 has reached a prescribed voltage (Vp).

When electrical charge corresponding to the prescribed capacitance is charged in the capacitor C and the input part 1, a charging action is ended and a discharging action is started. With respect to the discharging action, when the first switch A is in an on-state and the second switch B is in an off-state, the electric charge which has been charged in the capacitor C and the input part 1 flows into the resistor R, and so discharge is performed. At this time, since the circuit of the charge/discharge waveform forming part 13 is connected to the input part 1, a discharge state is to be affected by the variable capacitance (Cx) and the variable resistance (Rx) in the input part 1. When the prescribed voltage (reference voltage: Vb) is reached with the prescribed electric charge of the capacitor C and the input part 1 discharged, the discharging action is stopped and a charging action is started by an output signal (discharge end detection signal) from the comparator 31.

Figure 10:
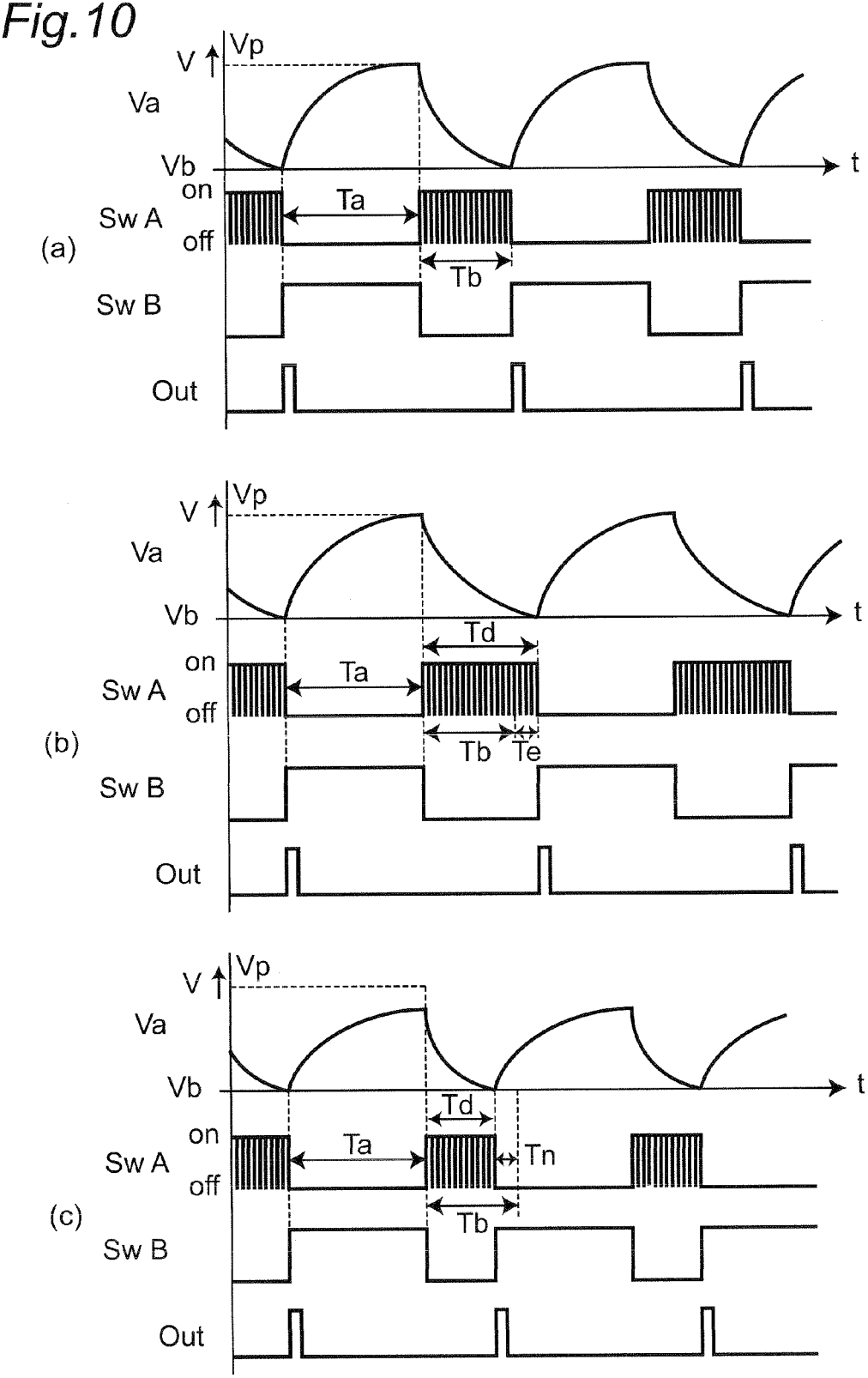
FIG. 10 is waveform diagrams in each element of the charge/discharge waveform forming part in the hybrid touch panel of the second embodiment according to the present invention.

FIG. 10 is waveform diagrams in each element in the charge/discharge waveform forming part 13. In FIG. 10, the charge/discharge waveform Va shows a voltage waveform inputted into the comparator 31 from the capacitor C and the input part 1, and SwA and SwB show the on-off state of the first switch A and the second switch B, respectively. The sign "Out" in FIG. 10 shows the output signal (discharge end detection signal) from the comparator 31.

In FIG. 10, (a) is a waveform diagram in a state (non-operation state) where the hybrid touch panel is not operated, (b) is a waveform diagram in a state (proximity state) where a finger, i.e. input means, is close to or in contact with the operation object face of the hybrid touch panel, and (c) is a waveform diagram in a state (depression load state) where the operation object face of the hybrid touch panel is depressed by the finger and the upper electrode part 10 and the lower electrode part 20 are electrically connected via the pressure-sensitive layer 5.

As shown in (a) of FIG. 10, the capacitor C and the input part 1 repeat a charging action and a discharging action intermittently by turning on and off the first switch A and the second switch B. Accordingly, the off-period Ta of the first switch A is a predetermined period, and the on-period Tb of the first switch A is almost the same period when a capacitance change by the capacitance detection 11 of the input part 1 is minute, and so turning on and off is repeated at almost the same interval in this period (Ta, Tb) in a non-operation state. The first switch A performs a discharging action in which on-off action is repeated intermittently in minute time in its on-period (Tb), i.e. a discharging action period. Accordingly, the discharge waveform of discharge occurring in the resistor R via the first switch A is a step-wise waveform microscopically. With the on-off action in the minute time in this first switch A counted, the detection of discharge time is performed. The count of the on-off action of the first switch A is detected in the charge/discharge waveform calculating part 14 (see FIG. 7), and so it is possible to form operation state information, operation position information and operation pressure information by the change of a count number.

The waveform diagram shown in (b) of FIG. 10 represents a state where a finger, i.e. input means, is close to or in contact with the operation object face of the hybrid touch panel and where the upper electrode part 10 and the lower electrode part 20 are not in contact with each other. That is, this represents a state where the finger is close to the operation object face and where the finger and the upper electrode part 10 are capacitively coupled. At this time, there also exists a capacitive coupling state between the upper electrode part 10 and the lower electrode part 20. As a result, in a state where the finger is close to or in contact with the operation object face, the variable capacitance (Cx) in the input part 1 (see FIG. 9) has changed, compared with the non-operation state shown in (a) of FIG. 10. Since the magnitude of a capacitance is inversely proportional to a distance between the finger and the upper electrode part 10 located on the operation object face, the capacitance between the finger and the upper electrode part 10 becomes large as the finger approaches the operation object face. As a result, detection discharge time (Td) in the charge/discharge waveform (Va) becomes longer by time (Te), compared with a non-operation state shown in (a) of FIG. 10. This detection discharge time (Td) is detected by the count number of the on-off action of the minute time of the first switch A. In this way, the operation state information and the operation position information of the finger on the operation object face can be determined by the change of the detection discharge time (Td) based on the change of a capacitance. In a proximity state shown in (b) of FIG. 10, the variable resistance Rx shown in FIG. 9 is infinite, indicating that a shut-off state is formed.

The waveform diagram shown in (c) of FIG. 10 represents a depression load state where the operation object face of the hybrid touch panel is depressed by the finger and where the upper electrode part 10 and the lower electrode part 20 are electrically connected via the pressure-sensitive layer 5. As mentioned above, the pressure-sensitive layer 5 has a characteristic that its electrical resistance value becomes small according to the magnitude of a pressure when it is pressurized. In the depression load state shown in (c) of FIG. 10, there is no capacitive coupling state as seen in the case of the proximity state shown in (b) of FIG. 10, and there is a stably electrically connected state between the finger, i.e. input means, and the upper electrode part 10 of the operation object face, and between the upper electrode part 10 and the lower electrode part 20. Accordingly, in the depression load state shown in (c) of FIG. 10, the variable capacitance (Cx) shown in FIG. 9 substantially becomes zero, and there appears a state where a current flows into the variable resistance (Rx). However, since a stray capacitance and the like exist in the circuit, the variable capacitance (Cx) cannot be zero. As a result, charge may not be performed up to the prescribed voltage (Vp) due to an insufficient charging period in the period of charge time (Ta) of the charge/discharge waveform (Va). With the influence above and the influence of the increase of a discharge current, the detection discharge time (Td) in the charge/discharge wave form (Va) becomes shorter by time (Tn), compared with the non-operation state shown in (a) of FIG. 10. In this way, the operation state information of the finger on the operation object face, the operation position information of the finger on the operation object face and the operation pressure information of the finger against the operation object face can be determined by detecting the detection discharge time (Td) from the change of an electrical resistance in the input part 1. The depression load state includes a state where the upper electrode part 10 and the lower electrode part 20 are merely electrically in contact with each other.

Figure 11:
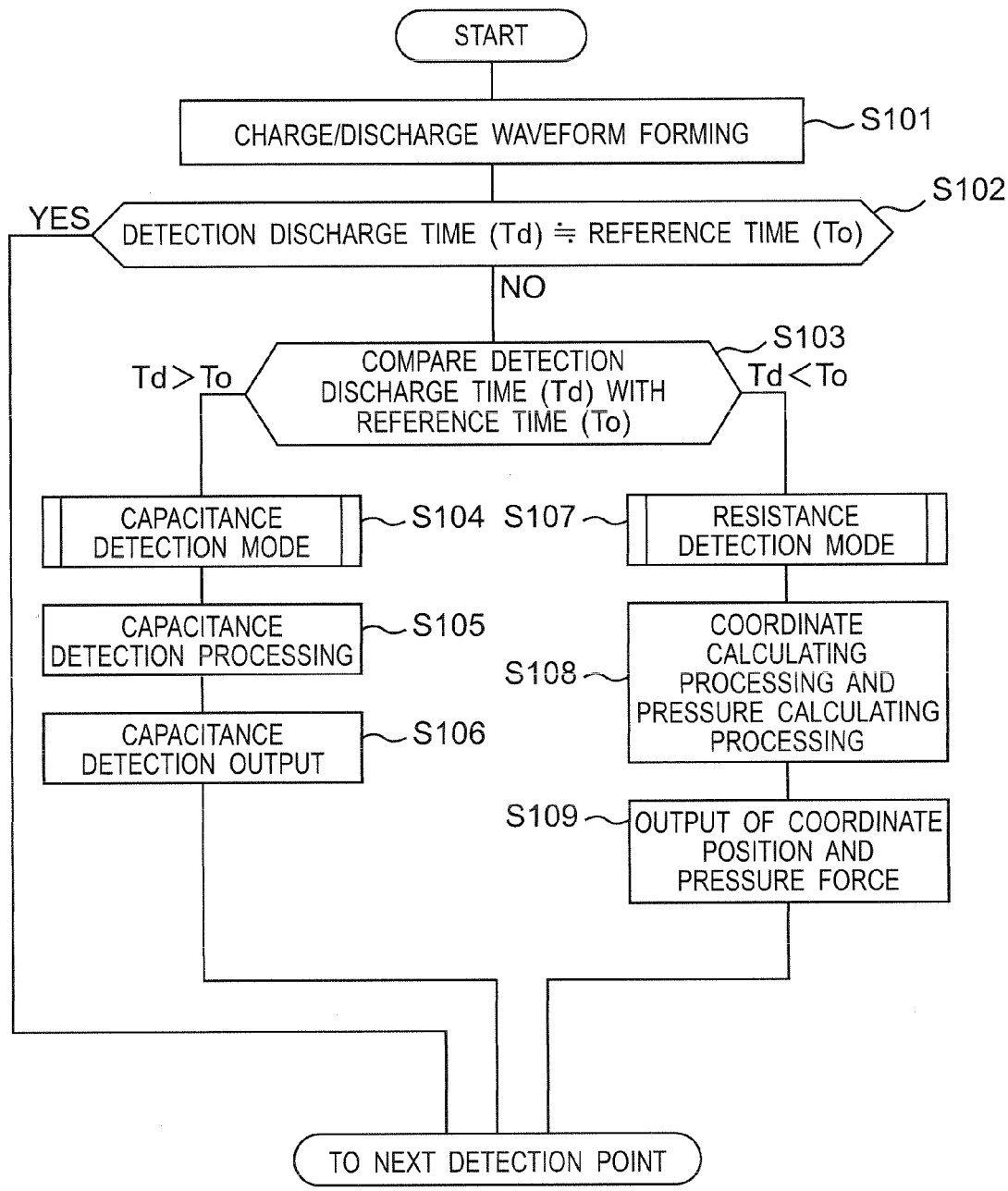
FIG. 11 is a flow chart illustrating a detection sequence of each detection point for detecting a capacitance and a pressure in the hybrid touch panel of the second embodiment according to the present invention.

FIG. 11 is a flow chart illustrating a detection sequence for detecting a capacitance and a pressure in each detection point in the hybrid touch panel of the second embodiment.

First, with electric power supplied to the hybrid touch panel, the detection sequence sequentially starts for all the detection points in the operation object area in the hybrid touch panel.

In the detection sequence in each detection point, and in step 101 (S101), the charge/discharge waveform (Va) is formed in the charge/discharge waveform forming part 13, as mentioned above. The detection discharge time (Td) in the formed charge/discharge waveform is compared with a reference time (To). Here, the reference time (To) is the discharge time (Tb) in a non-operation state (see (a) of FIG. 10) in the hybrid touch panel, and is set using time measured at the time of the non-operation state. In step 102 (S102), when the detection discharge time (Td) is almost the same as the reference time (To), the present state is regarded as a non-operation state and a return to step 101 (S101) is made.

In step 103 (S103), when the detection discharge time (Td) is longer than the reference time (To) by a certain period or more, the present state is regarded as a proximity state, and a shift to a capacitance detection mode (S104) is made. On the other hand, when the detection discharge time (Td) is shorter than the reference time (To) by a certain period or more, the present state is regarded as a depression load state, and a shift to a resistance detection mode (S107) is made.

In the capacitance detection mode (S104), capacitance detection processing (S105) that detects the change of a capacitance (C+Cx: see FIG. 8) is performed based on the detection discharge time (Td), and capacitance detection output (S106) is performed based on the detected change of a capacitance. That is, an operation state indicating whether or not the detection point has been operated is detected. After the capacitance detection output (S106) is performed, a similar detection sequence is performed by shifting to the next detection point in the operation object area.

In step 103, when the detection discharge time Td is shorter than the reference time To (Td<To), the resistance detection mode (S107) is performed. In this resistance detection mode (S107), the change of a resistance value (R*Rx/R+Rx: see FIG. 8) is detected based on the detection discharge time (Td), and coordinate calculating processing and pressure calculating processing (S108) are performed. As an example of this coordinate calculating processing, with one end of one of opposing electrodes connected to the input terminal of a detection circuit 50 configured by the charge/discharge waveform forming part 13 and the charge/discharge waveform calculating part 14, and with one end of the other electrode grounded, the resistance value including the change of the pressure-sensitive layer 5 can be measured. In this resistance value measurement, by modifying the combination of a connection state how one end of an electrode connected to the detection circuit 50 and one end of the other electrode grounded are connected, it is possible to detect a coordinate position (operation position) operated by the finger, i.e. input means, in the electrode. Such switching control is performed in the first drive part 60a and the second drive part 60b based on a control signal from the control part 70 (see FIG. 7). In the pressure calculating processing, since the resistance value of the pressure-sensitive layer 5 changes according to an extent to which the pressure-sensitive layer 5 is pressurized as mentioned above, a pressure force (operation pressure) is detected by detecting the change of a resistance value in each detection point in the operation object area. That is, when a depression load state is detected in the detection circuit 50 of the hybrid touch panel, on-off operations of the switching elements (SwA to SwH) connected to the first electrode lines (A to H) and on-off operations of the switching elements (Sw1 to Sw8) connected to the second electrode lines (1 to 8) are performed sequentially (resistance detection processing). Specifically, for example, in a state where one switching element (Sw1) for the lower electrode part 20 is turned on and the second electrode line (1) is connected to the detection circuit 50, switching control that turns the switching elements (SwA to SwH) for the upper electrode part 10 into an on-state once is performed sequentially, and the first electrode lines (A to H) in the upper electrode part 10 are sequentially connected to the detection circuit 50. In this way, by connecting each of the first electrode lines (A to H) to the detection circuit 50, resistance values in all the first electrode lines (A to H) for the second electrode line (1) are detected in the detection circuit 50.

In step 109 (S109), a signal showing a coordinate position (operation position) and a pressure force (operation pressure) which are both detected is outputted to the control part (not shown) of a portable electronic device on which the hybrid touch panel is provided. In this way, when the signal showing the coordinate position (operation position) and the pressure force (operation pressure) related to the detection point is outputted, shifting to a detection sequence for the next detection point is performed.

As mentioned above, when detection sequences for all the detection points in the operation object area are completed, release detection is performed in all the detection points in the operation object area. With respect to this release detection, detection discharge time (Td) and reference time (To) are compared in all the detection points, and when the detection discharge time (Td) is almost the same as the reference time (To), the release detection is performed, and so the detection sequences in the hybrid touch panel is completed. On the contrary, when the detection discharge time (Td) differs from the reference time (To), the detection sequences for all the detection points in the operation object area are performed again.

As mentioned above, the detection sequences are performed in the hybrid touch panel of the second embodiment, and each of a capacitance (operation state), a coordinate position (operation position) and a pressure force (operation pressure) is detected on all the detection points in the operation object area. Each of the detected signals is outputted to the control part (not shown) of the portable electronic device on which the hybrid touch panel is provided, and thus the portable electronic device is controlled.

In the hybrid touch panel of the second embodiment, although description was made using an example in which a finger is used as input means, the input means in the present invention is not limited to a finger, but anything can be used when it is a conductor. Furthermore, even in the case of a nonconductor such as a stylus, since a coordinate and a pressure can be detected by a resistance film digital system, there is no limitation about an input method.

In the hybrid touch panel of the second embodiment, although description was made using an example in which the capacitance detection signal (Cd) detected by the capacitance detection 11 and the resistance detection signal (Rd) detected by the resistance detection 12 in the input part 1 are used as a discharge waveform at the time of discharge in the charge/discharge waveform (Va), the present invention is not limited to this configuration, but the capacitance detection signal (Cd) and the resistance detection signal (Rd) which are detected by the capacitance detection 11 and the resistance detection 12, respectively, can also be used as a charge waveform at the time of charge. By using the capacitance detection signal (Cd) and the resistance detection signal (Rd) outputted from the input part 1 at the time of charge, it is possible to detect that the behavior of a charge waveform changes according to a capacitance and a resistance value, and it is also possible to detect each of a capacitance (operation state), a coordinate position (operation position) and a pressure force (operation pressure).

Furthermore, in the present invention, by using both of a charge waveform at the time of charge and a discharge waveform at the time of discharge in the charge/discharge waveform (Va), it is also possible to detect each of a capacitance (operation state), a coordinate position (operation position) and a pressure force (operation pressure) with higher accuracy. Also in this case, by using the capacitance detection signal (Cd) detected by the capacitance detection 11 and the resistance detection signal (Rd) detected by the resistance detection 12 in the input part 1 described in the second embodiment, a change appears in a charge waveform at the time of charge and in a discharge waveform at the time of discharge according to each of a capacitance (operation state), a coordinate position (operation position) and a pressure force (operation pressure), and this phenomenon can be used, enabling highly accurate detection.

In the hybrid touch panel of the second embodiment, although description was made on a hybrid touch panel which combines the configuration of a resistance-film-system digital-type (multi-type) touch panel and the configuration of an capacitance-system self-type touch panel, the present invention can configure a hybrid touch panel which combines the configuration of a resistance-film-system digital-type (multi-type) touch panel and the configuration of an capacitance-system mutual-type touch panel. Even in a mutual-type one, by using the capacitance detection signal (Cd) detected by the capacitance detection 11 and the resistance detection signal (Rd) detected by the resistance detection 12, the change of a waveform in the charge/discharge waveform (Va) is detected, and so the operation state (action state) and operation position (coordinate position) of input means can be detected.

Since the input part 1 in the hybrid touch panel of the second embodiment is provided on the liquid crystal screen of the display device and is formed of optically transparent materials on the whole, the input part 1 is configured such that input is performed by operating the operation object face of the input part 1 by a finger, i.e. input means, while visually observing. Accordingly, the upper film 2, the upper electrode part 10, the pressure-sensitive layer 5, the lower electrode part 20 and the lower film 8 in the input part 1 are formed of optically transparent materials. With respect to the configuration of the second embodiment, although description was made on the configuration where there exists air (index of refraction:1) in an internal space (opposing area 40 (see FIG. 6)) of the input part 1 in which the upper electrode part 10 and the lower electrode part 20 are arranged with facing each other, a configuration including a solution layer may be used in consideration of optical properties of the upper electrode part 10 and the lower electrode part 20, etc. As a solution layer, it is preferable to use a substance which has an index of refraction close to that of each material in the structure of the upper electrode part 10 and the lower electrode part 20, that is, a substance which has an index of refraction same as that of air or larger and which has fluidity, optical transparency, electrical insulation and heat resistance.

As a material of the upper film 2 and the lower film 8, a material usable for a flexible substrate can be used, which includes general-purpose resin such as, for example, polyethylene terephthalate, polystyrene-based resin, polyolefin-based resin, ABS resin, AS resin, acrylic resin or AN resin. The thicknesses of the upper electrode part 10 and the lower electrode part 20 are set at, for example, 5 μm to 25 μm. As a material of the upper electrode part 10 and the lower electrode part 20, it is preferable to use a transparent electrically conducting material such as an ITO, a CNT and an Ag wire ink. However, it is also possible to form the upper electrode part 10 and the lower electrode part 20 using a paste with electrical conductivity, which includes metal such as gold, silver, copper or nickel, or carbon. A method for forming these includes a printing method such as screen printing, offset printing, gravure printing or flexographic printing, or a photoresist method, etc. The upper electrode part 10 and the lower electrode part 20 can also be formed by pasting a metal foil such as a copper foil or a gold foil. Furthermore, the upper electrode part 10 and the lower electrode part 20 can also be formed in a way described as follows: an electrode pattern is formed with a resist on an FPC (flexible circuit board) which is plated with metal such as copper, and then a metal foil portion which is not protected by the resist is processed by etching.

In order to secure the opposing area 40 of the upper electrode part 10 and the lower electrode part 20, an adhesive agent 9 as a gap holding member is provided. The adhesive agent 9 has adhesiveness that glues the upper film 2 and the lower film 8 together and also serves as an insulating member for holding a gap between the opposing faces of the upper electrode part 10 and the pressure-sensitive layer 5. As an adhesive agent 9, a two-sided adhesive tape is included, for example, in which an adhesive agent such as an acrylic bonding paste is formed on both sides of a core material such as a polyethylene terephthalate film. The thickness of the adhesive agent 9 is set at, for example, 5 μm to 20 μm. The adhesive agent 9 may include various adhesive agents such as a UV curing resin and a heat curing resin, with a thickness set at 5 μm to 20 μm.

As mentioned above, the hybrid touch panel of the input device according to the present invention can input operation state information, operation position information and operation pressure information into electronic equipment, by detecting a capacitance, a resistance and a pressure with a simple circuit configuration, irrespective of what kind of input means is used, for example, whether the input means is a finger or a stylus; the hybrid touch panel is a highly general-purpose input device that can input a variety of information accurately and quickly by operating simple input means.

Although the present invention is fully described in relation with preferred embodiments with reference to the accompanying drawings, various variations and modifications are apparent to those skilled in the art. Such variations and modifications are included in the present invention, unless they depart from the scope of the present invention.

INDUSTRIAL APPLICABILITY

Since an input device according to the present invention can input a variety of information accurately and quickly when it is provided on various electronic equipment, the input device is useful for electronic equipment, for example, a portable information terminal like a PDA or a handy terminal, OA equipment like a copy machine and a facsimile, a smartphone, a portable telephone, a handheld game machine, an electronic dictionary, a car-navigation system, a small PC or various household appliances.

REFERENCE SIGNS LIST

1 Input part
2 Upper film
3 Upper wiring pattern
4 Upper detection electrode
5 Pressure-sensitive layer
6 Lower detection electrode
7 Lower wiring pattern
8 Lower film
9 Adhesion part
10 Upper electrode part
11 Capacitance detection
12 Resistance detection
13 Charge/discharge waveform forming part
14 Charge/discharge waveform calculating part
15 Output part
20 Lower electrode part
40 Opposing area
50 Detection circuit
60a First drive part
60b Second drive part
70 Control part

The invention claimed is:

1. An input device using detection of both a capacitance and a pressure, comprising:
an input part including electrode parts which are arranged with facing each other and with being electrically connectable and one of which has an electrode to be an operation object, and a pressure-sensitive layer which is disposed between the electrode parts facing each other and an electrical resistance of which changes according to a pressure against the electrode part being the operation object by input means of a conductor;
a charge/discharge waveform forming part which includes a charge/discharge circuit having at least a constant current source, a switching element, a capacitor and a resistor and which forms a charge/discharge waveform by being connected to the input part;
a charge/discharge waveform calculating part which calculates an operation state, an operation position and an operation pressure of the input means by detecting a change of a capacitance and of a pressure in the input part based on a charge/discharge waveform formed by the charge/discharge waveform forming part; and
an output part which outputs a signal showing the operation state, the operation position and the operation pressure of the input means calculated in the charge/discharge waveform calculating part.

2. The input device according to claim 1, wherein
the input part is configured to output a capacitance detection signal, which shows a capacitance between the input means and the electrode being the operation object, and a resistance detection signal, which shows a resistance value between the electrode parts electrically connected via the pressure-sensitive layer, to the charge/discharge waveform forming part.

3. The input device according to claim 2, wherein
the charge/discharge waveform forming part is configured to be connected to the input part at least at time of discharge of the charge/discharge circuit, and to form the charge/discharge waveform according to the capacitance detection signal and the resistance detection signal.

4. The input device according to claim 3, wherein
the charge/discharge waveform calculating part is configured to calculate discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object.

5. The input device according to claim 2, wherein
the charge/discharge waveform forming part is configured to be connected to the input part at least at time of charge of the charge/discharge circuit, and to form the charge/discharge waveform according to the capacitance detection signal and the resistance detection signal.

6. The input device according to claim 5, wherein
the charge/discharge waveform calculating part is configured to calculate charge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object.

7. The input device according to claim 2, wherein
the charge/discharge waveform forming part is configured to be connected to the input part at time of charge and discharge of the charge/discharge circuit, and to form the charge/discharge waveform according to the capacitance detection signal and the resistance detection signal.

8. The input device according to claim 7, wherein
the charge/discharge waveform calculating part is configured to calculate charge time and discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the electrode part being the operation object.

9. The input device according to claim 1, wherein
the electrode part and the pressure-sensitive layer are formed of an optically transparent material and are configured such that operation can be performed through the electrode part and the pressure-sensitive layer while visually observing a screen of a display device on which the input device is provided.

10. A capacitance-system hybrid touch panel equipped with a pressure-sensitive function, comprising:
an input part including:

electrically-connectable electrode parts arranged to face each other, the electrode parts including a first electrode part which has a plurality of first electrode lines in parallel with each other and which is to be an operation object by input means of a conductor, and a second electrode part opposing the first electrode part and having a plurality of second electrode lines which are orthogonal to the plurality of first electrode lines and which are contactable and separable arranged in a matrix shape with respect to the plurality of first electrode lines;

a pressure-sensitive layer which is disposed between the first electrode part and the second electrode part as in the opposing manner and which is sandwiched and fixed between the first electrode part and the second electrode part by a pressure force of the input means against the first electrode part, and an electrical resistance value of which changes according to a pressure of the sandwiching and the fixing, a detection circuit which is configured such that the input part is connected and such that a capacitance detection signal showing a capacitance between the input means and the first electrode part and a capacitance between the first electrode part and the second electrode part and a resistance detection signal showing an electrical resistance value between the first electrode part and the second electrode part which are electrically connected via the pressure-sensitive layer are inputted from the input part and such that an operation state, an operation position and an operation pressure of the input means are detected;

a first drive part having a plurality of switching elements which perform contact and separation between each of the plurality of first electrode lines and the detection circuit;

a second drive part having a plurality of switching elements which perform contact and separation between each of the plurality of second electrode lines and the detection circuit;

a control part performing drive control of the first drive control part and the second drive control part; and an output part which outputs a signal showing the operation state, the operation position, and the operation pressure of the input means detected by the detection circuit;

wherein the detection circuit includes:
  a charge/discharge waveform forming part including a charge/discharge circuit having at least a constant current source, a switching element, a capacitor and a resistor and which forms a charge/discharge waveform with the capacitance detection signal and the resistance detection signal inputted, and
  a charge/discharge waveform calculating part which detects a change of the capacitance and of the pressure in the capacitance detection signal and the resistance detection signal based on the charge/discharge waveform formed by the charge/discharge waveform forming part and which calculates the operation state, the operation position and the operation pressure of the input means.

11. The hybrid touch panel according to claim 10, wherein the control part is configured such that each predetermined number of neighboring electrode lines among the plurality of first electrode lines put together are defined as a first electrode line group and a plurality of first electrode line groups is defined as a first detection electrode and such that on-off control is performed for the switching element corresponding to the first detection electrode in the first drive part and such that drive control of the plurality of first electrode line groups is performed and also drive control of the plurality of second electrode lines defined as a second detection electrode is performed.

12. The hybrid touch panel according to claim 11, wherein the control part is configured such that a plurality of selected second electrode lines obtained by thinning the plurality of second electrode lines is defined as the second detection electrode and such that on-off control is performed for the switching element corresponding to the second detection electrode in the second drive part and such that drive control of the selected second electrode lines is performed.

13. The hybrid touch panel according to claim 11, wherein the control part is configured such that each predetermined number of neighboring electrode lines among the plurality of second electrode lines put together are defined as a second electrode line group and a plurality of second electrode line groups are defined as the second detection electrode and such that on-off control is performed for the switching element corresponding to the second detection electrode in the second drive part and drive control of the plurality of second electrode line groups is performed.

14. The hybrid touch panel according to claim 10, wherein the charge/discharge waveform forming part is configured to be connected to the input part at least at time of discharge of the charge/discharge circuit, and to form the charge/discharge waveform according to the capacitance detection signal and the resistance detection signal.

15. The hybrid touch panel according to claim 14, wherein the charge/discharge waveform calculating part is configured to calculate discharge time across a prescribed voltage in the charge/discharge waveform formed by the charge/discharge waveform forming part, and to detect the change of the capacitance and of the pressure in the input part, and to form the signal showing the operation state, the operation position and the operation pressure of the input means in the first electrode part being the operation object.

16. The hybrid touch panel according to claim 10, wherein the charge/discharge waveform forming part is configured to be connected to the input part at least at time of charge of the charge/discharge circuit, and to form the charge/discharge waveform according to the capacitance detection signal and the resistance detection signal.

17. The hybrid touch panel according to claim 16, wherein the charge/discharge waveform calculating part is configured to calculate the charge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the first electrode part being the operation object.

18. The hybrid touch panel according to claim 10, wherein the charge/discharge waveform forming part is configured to be connected to the input part at time of charge and discharge of the charge/discharge circuit, and to form the charge/discharge waveform according to the capacitance detection signal and the resistance detection signal.

19. The hybrid touch panel according to claim 18, wherein the charge/discharge waveform calculating part is configured to calculate charge and discharge time across the prescribed voltage in the charge/discharge waveform formed by the charge/discharge waveform forming part, and to detect the change of the capacitance and of the pressure in the input part, and to form the signal showing the operation state, the operation position and the operation pressure of the input means in the first electrode part being the operation object.

* * * * *